United States Patent
Antoku et al.

(10) Patent No.: US 7,173,786 B2
(45) Date of Patent: Feb. 6, 2007

(54) MAGNETIC DISK DRIVE APPARATUS AND METHOD FOR COMPENSATING CHARACTERISTICS OF MAGNETIC DISK DRIVE APPARATUS

(75) Inventors: Yosuke Antoku, Tokyo (JP); Hiroki Matsukuma, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/206,911

(22) Filed: Aug. 19, 2005

(65) Prior Publication Data

US 2006/0215308 A1    Sep. 28, 2006

(30) Foreign Application Priority Data

Sep. 8, 2004 (JP) .............................. 2004-260751
Jul. 28, 2005 (JP) .............................. 2005-218735

(51) Int. Cl.
 G11B 5/03 (2006.01)
 G11B 5/02 (2006.01)
 G11B 5/09 (2006.01)

(52) U.S. Cl. .............................. 360/66; 360/48; 360/67
(58) Field of Classification Search ..................... None
See application file for complete search history.

(56) References Cited

U.S. PATENT DOCUMENTS 5,682,272 A * 10/1997 Taroda et al. ................. 360/53
6,064,534 A * 5/2000 Simozato ..................... 360/46
6,124,998 A * 9/2000 Kanegae ...................... 360/68
6,857,937 B2 * 2/2005 Bajorek .......................... 451/5
6,914,738 B2 * 7/2005 Fujiwara et al. .............. 360/68
6,995,933 B1 * 2/2006 Codilian et al. .............. 360/46
2004/0179286 A1 * 9/2004 Yang ............................ 360/51

FOREIGN PATENT DOCUMENTS

| JP | 10-134305 | 5/1998 |
| JP | 2001-93104 | 4/2001 |
| JP | 2003-36502 | 2/2003 |

\* cited by examiner

*Primary Examiner*—K. Wong
(74) *Attorney, Agent, or Firm*—Oblon, Spivak, McClelland, Maier & Neustadt, P.C.

(57) ABSTRACT

A magnetic disk drive apparatus includes a magnetic disk with a data region, a magnetic head located in a region of the magnetic disk other than the data region or outside of the magnetic disk before startup of the magnetic disk and loaded on the data region after the startup, and a current supply unit for providing, just after the startup, a dummy write current with a current value lower than a normal write current value to the magnetic head located in the region of the magnetic disk other than the data region or outside of the magnetic disk.

30 Claims, 18 Drawing Sheets

MAGNETIC DISK DRIVE APPARATUS AND METHOD FOR COMPENSATING CHARACTERISTICS OF MAGNETIC DISK DRIVE APPARATUS

PRIORITY CLAIM

This application claims priority from Japanese patent application No. 2004-260751, filed on Sep. 8, 2004, and Japanese patent application No. 2005-218735, filed on Jul. 28, 2005, which are incorporated herein by reference.

BACKGROUND OF THE INVENTION

1. Field of the Invention

The present invention relates to a magnetic disk drive apparatus provided with a magnetic disk and a magnetic head for writing information onto the magnetic disk, to a mobile phone or a vehicle-mounted system with the magnetic disk drive apparatus, and to a method for compensating characteristics of the magnetic disk drive apparatus.

2. Description of the Related Art

Japanese patent publication No. 2001-093104A discloses an error recovering method for correcting imbalance in magnetic domain of a magnetoresistive effect (MR) read head element of a magnetic head in a magnetic disk drive apparatus. The imbalance is corrected by moving the magnetic head into a contact-start-stop (CSS) region of the magnetic disk and performing dummy write of an inductive write head element.

Japanese patent publication No. 10-134305A discloses a method for stabilizing change in output wave-shape of an MR read head element of a magnetic head in a magnetic disk drive apparatus. The wave-shape is stabilized by moving the magnetic head into a dummy write region and performing dummy write of an inductive write head element with a write current that is larger than the normal write current under supplying a sense current that is larger than the normal sense current to the MR head element.

Japanese patent publication No. 2003-036502A discloses a method for recovering characteristics of an MR read head element of a magnetic head in a magnetic disk drive apparatus. In case that a write magnetic field from an inductive write head element is applied to the MR read head element to deform its output signal shape, recovering of the characteristics of the MR read head element is performed by temporally resting the magnetic head in an evacuation region of the magnetic disk and executing dummy write of the inductive write head element.

Recently, a magnetic disk drive apparatus is beginning to be assembled in a mobile equipment such as a vehicle-mounted equipment of for example a car navigation system or a car audio system, or a mobile phone. In such case, the magnetic disk drive apparatus is required to operate under harsher environments as compared with when assembled in a walkabout computer.

If the magnetic disk drive apparatus is left for a long time under a low temperature environment of 0° C. or –20° C. and/or under a high temperature environment of 80° C. or 100° C., inner stress of the magnetic head will change due to a difference between expansion coefficients of materials used. This change in the inner stress will induce magnetostriction in an upper shield layer or a yoke in the magnetic head, which is made of a magnetic material causing the magnetic characteristics of the write head element to deteriorate. Thus, normal operation of data writing just after startup of the magnetic disk or the magnetic disk drive apparatus cannot be expected causing occurrence of operation error. External magnetic stress due to some reason other than the low or high temperature may be applied to the magnetic head causing the magnetic characteristics of the write head element to deteriorate.

All of the aforementioned conventional dummy write methods intend to recover characteristics of MR read head elements by providing a dummy write current that is equal to or larger than the normal write current to inductive write head elements but do not intend to prevent magnetic characteristics of the write head elements from deterioration. If such conventional dummy write methods are performed, because no air-cooling effect due to the rotation of the magnetic disk is expected, the temperature of each magnetic head will extremely increase. Thus, when the dummy write current that is equal to or larger than the normal write current is applied to the inductive write head elements, the MR read head elements may be rather damaged.

SUMMARY OF THE INVENTION

It is therefore an object of the present invention to provide a magnetic disk drive apparatus and a method for compensating characteristics of the magnetic disk drive apparatus, whereby write characteristics of a write head element can be reliably recovered without adversely affecting a read head element.

Another object of the present invention is to provide a magnetic disk drive apparatus and a method for compensating characteristics of the magnetic disk drive apparatus, whereby write characteristics of a write head element can be reliably recovered without extending a startup period of time.

According to the present invention, a magnetic disk drive apparatus includes a magnetic disk with a data region, a magnetic head located in a region of the magnetic disk other than the data region or outside of the magnetic disk before startup of the magnetic disk and loaded on the data region after the startup, and a current supply unit for providing, just after the startup, a dummy write current with a current value lower than a normal write current value to the magnetic head located in the region of the magnetic disk other than the data region or outside of the magnetic disk.

Just after startup of the magnetic disk, under the state that the magnetic head is retracted in a region of the magnetic disk other than the data region, for example in the CSS region, or outside of the magnetic disk, for example at the unload position, dummy write is performed by a dummy write current with a current value lower than a normal write current value. By performing this dummy write, it is possible to recover deterioration in magnetic characteristics of the write head element due to magnetostriction in an upper shield layer or a yoke caused by inner stress change in the magnetic head or due to application of external magnetic field stress. Also, by performing the dummy write just after the startup, the write characteristics can be reliably recovered without extending a startup period of time. Particularly, because the dummy write current value is lower than the normal write current value, even if the magnetic head stays in a region of the magnetic disk other than the data region or outside of the magnetic disk, the magnetic head is never excessively heated. Therefore, the write characteristics of the write head element can be reliably recovered without damaging the read head element.

It is preferred that the current supply unit includes a dummy write condition control unit for controlling conditions of the dummy write current in accordance with an environment temperature of the magnetic head.

It is also preferred that the magnetic disk drive apparatus further includes a temperature detection unit for obtaining the environment temperature of the magnetic head, and that the dummy write condition control unit includes a unit for determining conditions of the dummy write current in accordance with the environment temperature obtained by the temperature detection unit and a unit for providing the dummy write current to the magnetic head based upon the determined conditions.

It is further preferred that the magnetic head includes an inductive write head element, and that the temperature detection unit includes a unit for detecting a resistance of the inductive write head element.

It is still further preferred that the wherein the magnetic head includes an inductive write head element and an MR read head element, and that the temperature detection unit includes unit for detecting a resistance of the MR read head element.

It is preferred that the dummy write condition control unit includes a unit for determining conditions of the dummy write current in accordance with temperature data representing the environment temperature of the magnetic head, the temperature data being provided from outside of the magnetic disk drive apparatus, and a unit for providing the dummy write current to the magnetic head based upon the determined conditions.

It is also preferred that the dummy write condition control unit includes a unit for determining conditions of the dummy write current in accordance with the environment temperature so that a temperature of the magnetic head becomes a predetermined temperature and a unit for providing the dummy write current to the magnetic head based upon the determined conditions.

It is further preferred that the dummy write condition control unit includes a unit for providing the dummy write current with a current value larger when the environment temperature is low than when the environment temperature is high to the magnetic head.

It is further preferred the dummy write condition control unit includes a unit for providing the dummy write current with a frequency higher when the environment temperature is low than when the environment temperature is high to the magnetic head.

It is also preferred that the dummy write condition control unit includes a unit for providing the dummy write current to the magnetic head for a period of time longer when the environment temperature is low than when the environment temperature is high.

It is preferred that the dummy write condition control unit includes a unit for providing the dummy write current to the magnetic head after the magnetic disk starts its rotation and until the rotational speed of the magnetic disk reaches a normal constant rotational speed.

It is also preferred that the dummy write condition control unit includes a unit for providing the dummy write current with a current value equal to or larger than 25% of a normal write current value to the magnetic head.

It is preferred that the dummy write condition control unit includes a unit for providing the dummy write current to the magnetic head so that a temperature increase of the magnetic head is kept lower than 60° C.

It is further preferred that the dummy write condition control unit includes a unit for providing the dummy write current to the magnetic head at every time of startup and restartup of the magnetic disk.

According to the present invention, also, a mobile phone or a vehicle-mounted system has the aforementioned magnetic disk drive apparatus.

According to the present invention, furthermore, a method for compensating characteristics of a magnetic disk drive apparatus having a magnetic disk with a data region and a magnetic head, the method includes a step of providing, just after a startup of the magnetic disk, a dummy write current with a current value lower than a normal write current value to the magnetic head located in a region of the magnetic disk other than the data region or outside of the magnetic disk.

By performing the dummy write just after the startup, write characteristics of the write head element can be reliably recovered without extending a startup period of time. Particularly, because the dummy write current value is lower than the normal write current value, even if the magnetic head stays in a region of the magnetic disk other than the data region or outside of the magnetic disk, the magnetic head is never excessively heated. Therefore, the write characteristics of the write head element can be reliably recovered without damaging the read head element.

It is preferred that the step includes a dummy write condition control step of controlling conditions of the dummy write current in accordance with an environment temperature of the magnetic head.

It is also preferred that the method further includes a step of obtaining the environment temperature of the magnetic head, and that the dummy write condition control step includes a step of determining conditions of the dummy write current in accordance with the environment temperature obtained and a step of providing the dummy write current to the magnetic head based upon the determined conditions.

It is further preferred that the magnetic head includes an inductive write head element, and that the step of obtaining the environment temperature includes a step of detecting a resistance of the inductive write head element.

It is still further preferred that the magnetic head includes an inductive write head element and a MR read head element, and that the step of obtaining the environment temperature includes a step of detecting a resistance of the MR read head element.

It is preferred that the dummy write condition control step includes a step of determining conditions of the dummy write current in accordance with temperature data representing the environment temperature of the magnetic head, the temperature data being provided from outside of the magnetic disk drive apparatus, and a step of providing the dummy write current to the magnetic head based upon the determined conditions.

It is also preferred that the dummy write condition control step includes a step of determining conditions of the dummy write current in accordance with the environment temperature so that a temperature of the magnetic head becomes a predetermined temperature and a step of providing the dummy write current to the magnetic head based upon the determined conditions.

It is further preferred that the dummy write condition control step includes a step of providing the dummy write current with a current value larger when the environment temperature is low than when the environment temperature is high to the magnetic head.

It is also preferred that the dummy write condition control step includes a step of providing the dummy write current with a frequency higher when the environment temperature is low than when the environment temperature is high to the magnetic head.

It is preferred that the dummy write condition control step includes a step of providing the dummy write current to the magnetic head for a period of time longer when the environment temperature is low than when the environment temperature is high.

It is further preferred that the dummy write condition control step includes a step of providing the dummy write current to the magnetic head after the magnetic disk starts its rotation and until the rotational speed of the magnetic disk reaches a normal constant rotational speed.

It is preferred that the dummy write condition control step includes a step of providing the dummy write current with a current value equal to or larger than 25% of a normal write current value to the magnetic head.

It is further preferred that the dummy write condition control step includes a step of providing the dummy write current to the magnetic head so that a temperature increase of the magnetic head is kept lower than 60° C.

It is still further preferred that the dummy write condition control step includes a step of providing the dummy write current to the magnetic head at every time of startup and restartup of the magnetic disk.

Further objects and advantages of the present invention will be apparent from the following description of the preferred embodiments of the invention as illustrated in the accompanying drawings.

DESCRIPTION OF THE PREFERRED EMBODIMENTS

Figure 1:
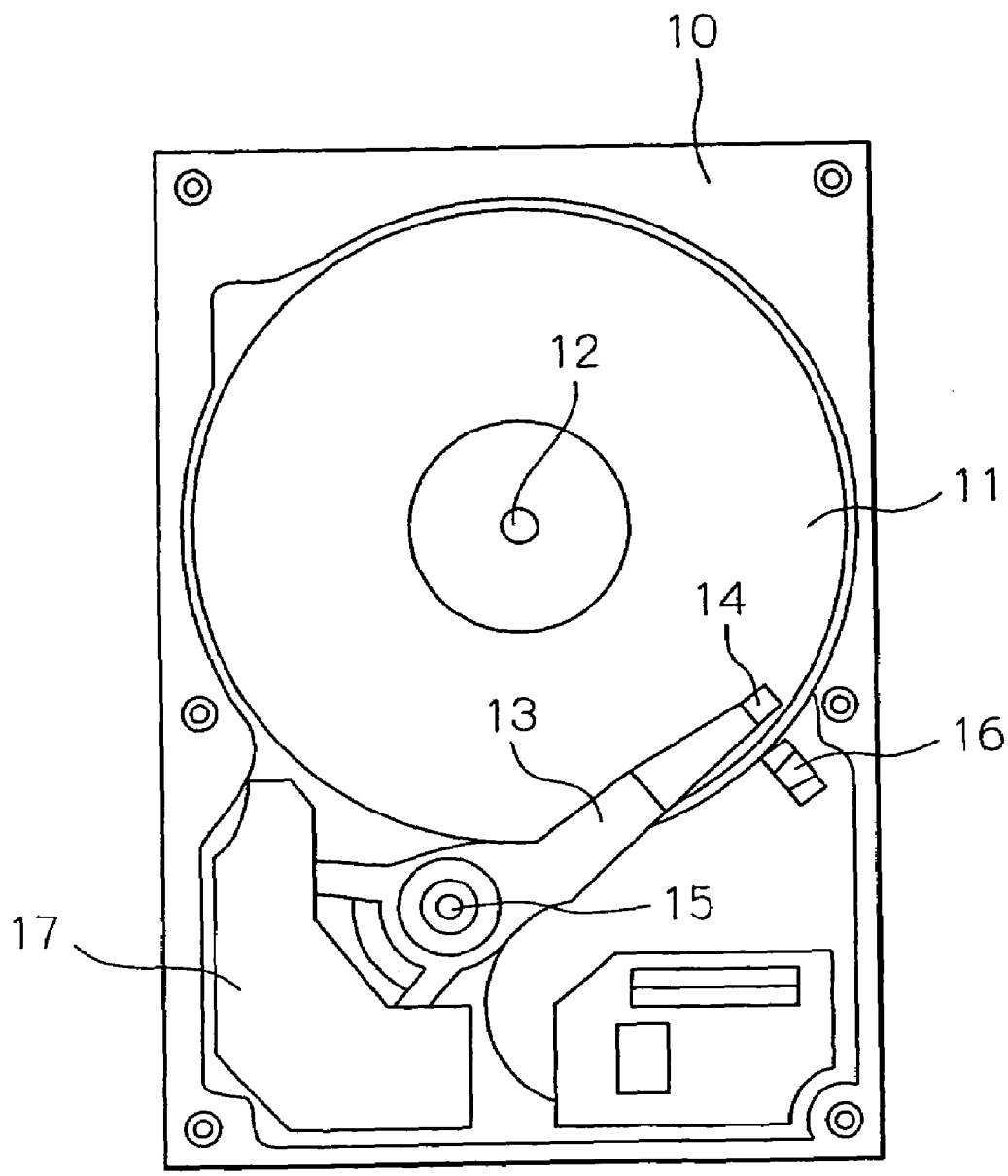
FIG. 1 is a plane view schematically illustrating a whole configuration of a magnetic disk drive apparatus as a preferred embodiment according to the present invention.

FIG. 1 schematically illustrates a whole configuration of a magnetic disk drive apparatus as a preferred embodiment according to the present invention. The magnetic disk drive apparatus in this embodiment is a load/unload type HDD apparatus having high impact resistance.

In the figure, reference numeral 10 denotes a housing, 11 denotes a magnetic disk driven by a spindle motor (not shown in this figure) to rotate about an axis 12, 13 denotes a head arm assembly (HAA) rotationally movable about a horizontal rotation axis 15 in parallel with the surface of the magnetic disk 11, 14 denotes a magnetic head mounted on the top end section of the HAA 13, 16 denotes a ramp located above outside of a data region of the magnetic disk 11 or outside of the magnetic disk 11, and 17 denotes a magnet part of a voice coil motor (VCM), respectively. A coil part of the VCM is mounted on the rear end section of the HAA 13. On an inclined surface of the ramp 16, the top end section of the HAA 13 will be riding during the unload state. The magnetic head 14 in this embodiment is configured by a composite type magnetic head provided with an inductive write head element and a GMR read head element or a tunnel magnetoresistive effect (TMR) read head element.

During out of rotation of the magnetic disk and during low speed rotation of the magnetic disk due to startup or restartup and halting, the top end section of the HAA 13 rides on the ramp 16 to stay the magnetic head 14 at the unload position.

Figure 2:
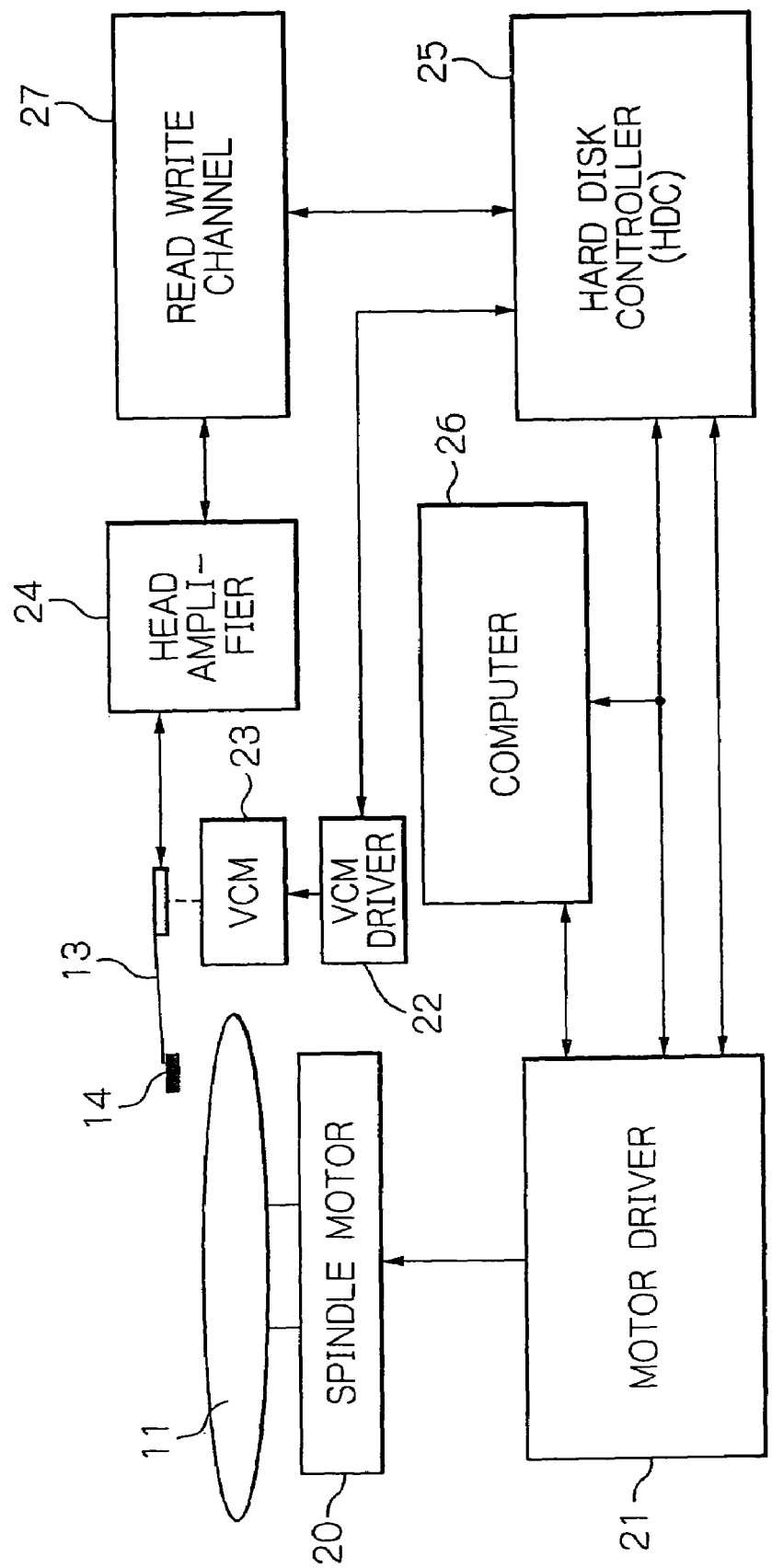
FIG. 2 is a block diagram schematically illustrating an electrical configuration of a hard disk drive (HDD) apparatus of the embodiment shown in FIG. 1.

FIG. 2 schematically illustrates an electrical configuration of the HDD apparatus of this embodiment.

In the figure, reference numeral 20 denotes the spindle motor for rotating the magnetic disk 11, 21 denotes a motor driver of this spindle motor 20, 22 denotes a VCM driver for the VCM 23, 24 denotes a head amplifier of the magnetic head 14, and 25 denotes a hard disk controller (HDC) for controlling in accordance with directions from a computer 26 the motor driver 21, the VCM driver 22 and the head amplifier 24 through a read write channel 27, respectively.

Figure 3:
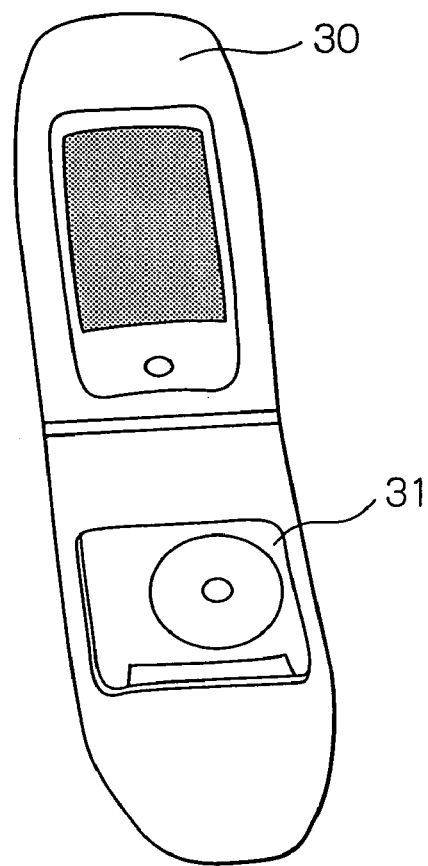
FIG. 3 is an oblique view schematically illustrating an example of equipment to which the HDD apparatus of the embodiment shown in FIG. 1 is assembled.
Figure 4:
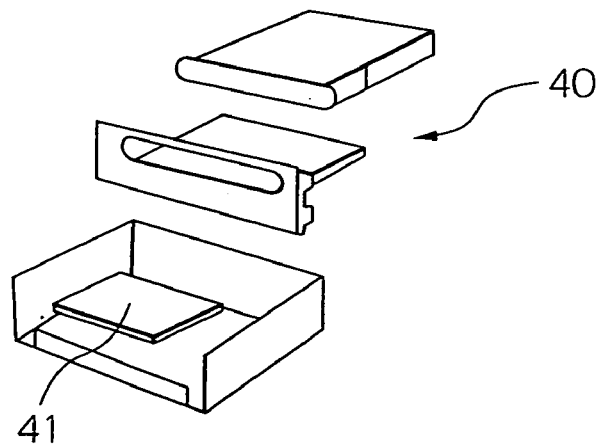
FIG. 4 is an exploded oblique view schematically illustrating another example of equipment to which the HDD apparatus of the embodiment shown in FIG. 1 is assembled.

FIGS. 3 and 4 schematically illustrate examples of equipment to which the HDD apparatus of this embodiment is assembled, respectively.

When the HDD apparatus 31 of this embodiment is assembled in a mobile phone 30 as shown in FIG. 3, good magnetic characteristics of the write head element can be kept even if the mobile phone 30 is used under a hostile environment stress such as under an extremely low temperature environment.

Also, when the HDD apparatus 41 of this embodiment is assembled in a vehicle-mounted system 40 such as a car navigation system as shown in FIG. 4, good magnetic characteristics of the write head element can be kept even if the vehicle-mounted system 40 is used under a hostile environment stress such as under an extremely low temperature environment.

The HDD apparatus of this embodiment can be adopted to various systems other than these shown in FIGS. 3 and 4. For example, the HDD apparatus may be assembled in mobile equipment such as a walkabout personal computer, a digital audio player or other mobile gear, or the HDD apparatus may be used itself as a mobile storage or a removable HDD.

Figure 5:
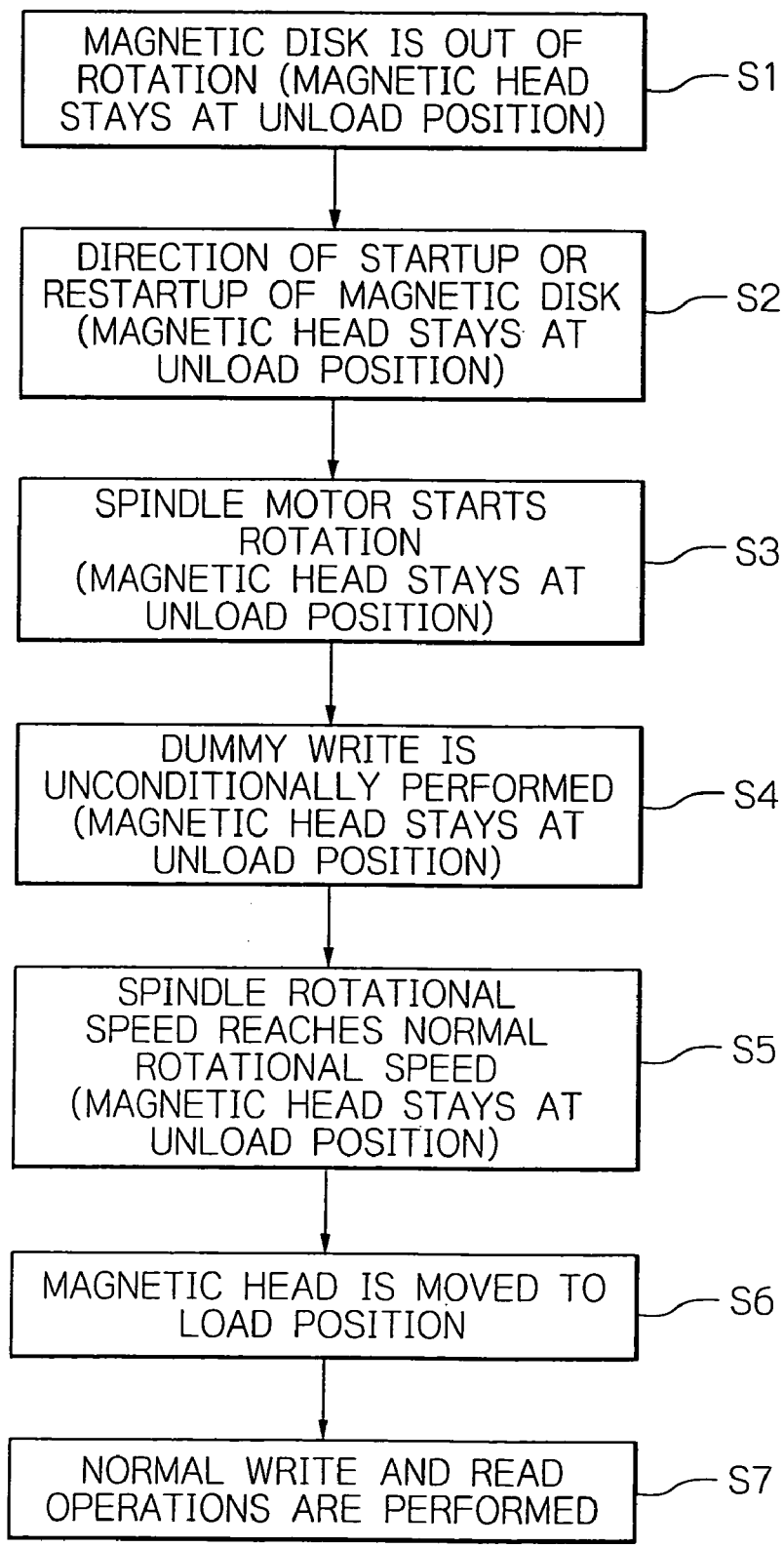
FIG. 5 is a flow chart illustrating a sequence at a startup of a magnetic disk of the HDD apparatus of the embodiment shown in FIG. 1.
Figure 6:
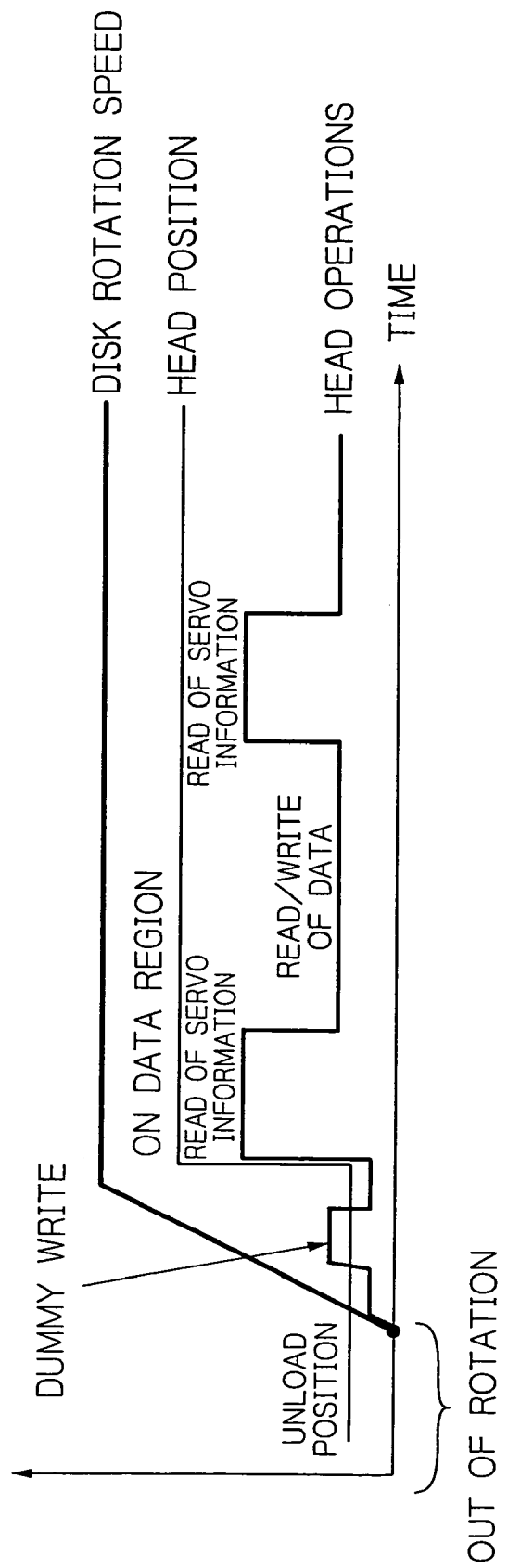
FIG. 6 is a sequence chart illustrating a position of the magnetic head, operation of the magnetic head and change in rotational speed of the magnetic disk at the startup of the magnetic disk of the embodiment shown in FIG. 1.

FIG. 5 illustrates a sequence at a startup of a magnetic disk of the HDD apparatus of this embodiment, and FIG. 6 illustrates a position of the magnetic head, operation of the magnetic head and change in rotational speed of the magnetic disk at the startup of the magnetic disk of this embodiment.

Hereinafter, operations of the HDD apparatus of this embodiment will be described using these figures.

During out of rotation of the magnetic disk 11, the magnetic head 14 stays at the unload position (Step S1).

When a direction of startup or restartup is given (Step S2), the HDC 25 instructs the motor driver 21 to start the spindle rotation, so as to start a rotation of the spindle motor 21 (Step S3). At this stage, because no drive instruction is output to the VCM driver 22 from the HDC 25, the magnetic head 14 keeps to stay at the unload position.

Under this state, in this embodiment, a signal is unconditionally applied to the head amplifier 24 from the HDC 25 via the read write channel 27 to provide a dummy write current to the inductive write head element. Thus, dummy write is unconditionally performed (Step S4). The dummy write current value is determined to a value less than 100% of a normal write current value but equal to or larger than 25% of the normal write current value.

The write characteristics of magnetic head can be recovered by flowing a dummy current with a value equal to or larger than 25% of the normal write current value. During dummy write operations, the magnetic head stays at the unload position and thus no air-cooling effect due to the rotation of the magnetic disk is obtained. Then, if the dummy write current value is equal to or larger than 100% of the normal write current value, the magnetic head will be heated to an excessive degree. Therefore, the dummy write is performed with a current value less than 100% of the normal write current value.

Hereinafter, grounds of these values of the dummy current will be described.

Figure 7:
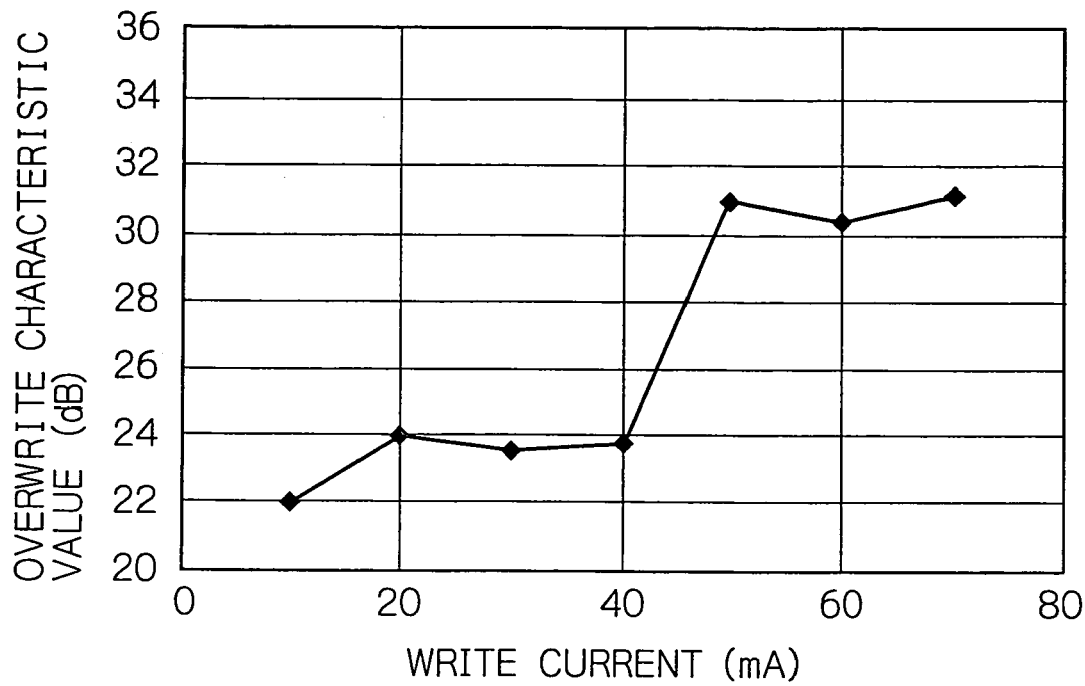
FIG. 7 is a graph illustrating overwrite characteristics when a write current is changed under on-disk state of the magnetic head.

FIG. 7 illustrates overwrite characteristics when a write current is changed under on-disk state of the magnetic head. In the figure, the lateral axis indicates a write current value (mA), and the longitudinal axis indicates overwrite characteristic value (dB). The frequency of the write current is 300 MHz. In this specification, the on-disk state represents a state wherein the magnetic head stays at the load position and the magnetic disk rotates at a normal rotational speed, and the off-disk state represents a state wherein the magnetic head stays at the unload position and the magnetic disk does not rotate.

As shown in the figure, when the write current increases, the overwrite characteristic value steeply changes at the current value of 40 mA that is the normal write current value and then the write characteristics is suddenly recovered at the write current value higher than this inflection point.

Figure 8:
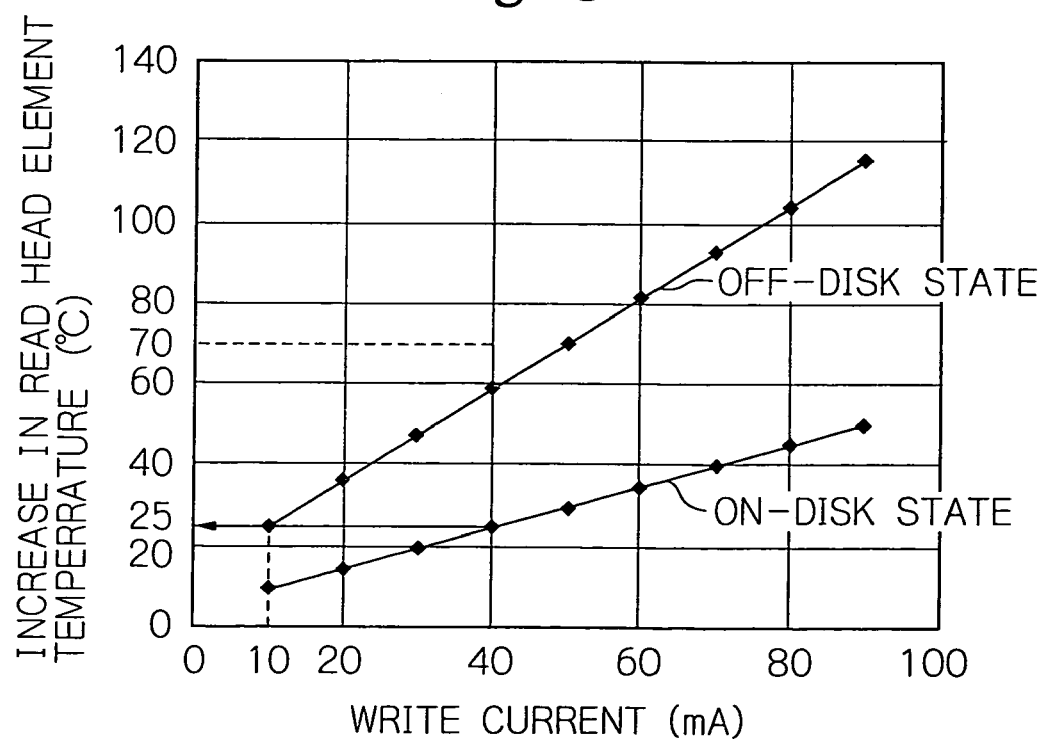
FIG. 8 is a graph illustrating temperature characteristics of the read head element when a write current is changed under on-disk state and off-disk state of the magnetic head.

FIG. 8 illustrates temperature characteristics of the read head element when the write current is changed under on-disk state and off-disk state of the magnetic head. In the figure, the lateral axis indicates a write current value (mA), and the longitudinal axis indicates increase in temperature of the read head element (° C.). The frequency of the write current is 300 MHz.

As will be noted from this figure, the temperature characteristics differ with each other between the on-disk state and the off-disk state. Under the on-disk state, if a write current of 40 mA flows, temperature of the read head element will increase by 25° C. As mentioned with reference to FIG. 7, the write characteristics is recovered when the write current of 40 mA or more flows. Therefore, the write characteristics is recovered under the conditions where the read head element temperature increases by 25° C. or more. In order to increase the read head element temperature by 25° C. under the off-disk state, it is enough to provide the write current of 10 mA, that is, the dummy write current of 10 mA to the write head element. Thus, the dummy current value should be determined to a current value equal to or larger than 25% of the normal write current value of 40 mA.

In general, if the read head element temperature increases by 70° C. or more, reliability of the read head element will certainly deteriorate. Thus, giving a margin of 10° C., it is desired that the temperature increase of the read head element is kept less than 60° C. This is attained by keeping the write current to the write head element under the off-disk state, that is, the dummy write current at a value less than 40 mA. Thus, the dummy current value should be determined to a current value less than 100% of the normal write current value of 40 mA.

It will be understood from FIG. 8 that when the write current is kept at 40 mA, the read head element temperature under the off-disk state increases about 2.4-fold with respect to the temperature under the on-disk state.

A total heating value W due to the write current is represented as $W=A+B$, where A is a heating value due to the DC component of the write current, and B is a heating value due to the AC component of the write current. If the AC component heating value B is ignored, the total heating value under the on-disk state W is represented as $W=A=kI_w^2$, where $I_w$ is a write current under the on-disk state, and k is a constant. The same heating value is obtained by a write current under the off-disk state $I_w'$ as $kI_w'^2=2.4\ kI_w^2$. Thus, the write current under the off-disk state $I_w'$ is represented as $I_w'=(kI_w^2/2.4\ kI_w'^2)^{1/2}=(I_w^2/2.4)^{1/2} \cong 0.65\ I_w$. It has been confirmed that the write characteristics can be recovered by the temperature increase due to the current flowing under the on-disk state with the same current value as the normal write current. Therefore, the write current under the off-disk state or the dummy current with a value of about 65% of the normal write current is enough for recovering the write characteristics.

When the write current is a high frequency current and its frequency rises, the heating value B due to an eddy current produced by the AC component of the write current increases. It is desired that the frequency of the write current is 250 MHz or more.

Figure 9:
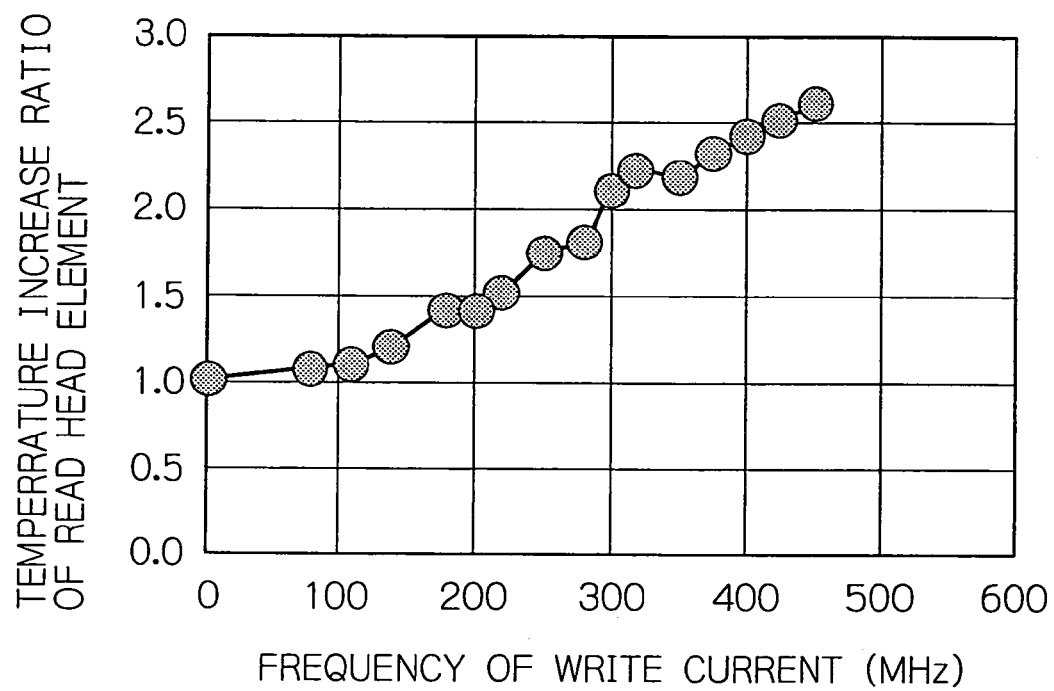
FIG. 9 is a graph illustrating an example of frequency-dependent heating value characteristics due to the write current.

FIG. 9 illustrates an example of heating value characteristics depending upon a frequency of the write current. In the figure, the lateral axis indicates a frequency of the write current (MHz), and the longitudinal axis indicates a temperature increase ratio of the read head element, namely a ratio in a temperature increase with respect to a reference temperature increase of 50° C. that is obtained by flowing a DC write current.

It is noted from this figure that the temperature increase due to the AC component of the write current increase when the frequency of the write current increases, and that the ratio in temperature increase due to the AC component with respect to that due to the DC component of the write current becomes about 2.0 at 300 MHz. If the AC component heating value B is considered, the total heating value under the on-disk state W is represented as $W=A+B=A+A=2A=2$ $kIw^2$. The same heating value is obtained by a write current under the off-disk state Iw' represented as $Iw' \cong 0.65\ Iw/(2)^{1/2}=0.460\ Iw$. It has been confirmed that the write characteristics can be recovered by the temperature increase due to the current flowing under the on-disk state with the same current value as the normal write current. Therefore, when the AC component heating value is considered, namely when the write current is a high frequency current, the write current under the off-disk state or the dummy current with a value of about 46.0% of the normal write current is enough for recovering the write characteristics.

The above-mentioned temperature increase due to the AC component of the write current is at the write current frequency of 300 MHz. If the frequency is 400 MHz, the temperature increases by about 20° C. from that at 300 MHz, and similarly if the frequency is 500 MHz, the temperature further increases by about 20° C. from that at 400 MHz.

Figure 10:
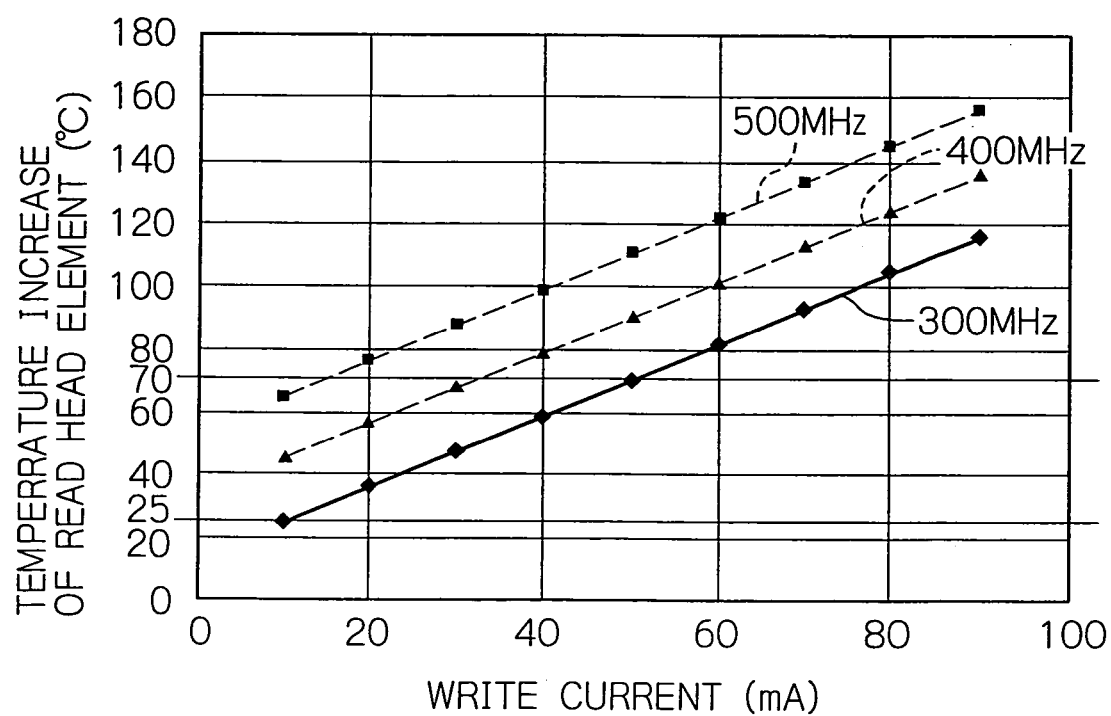
FIG. 10 is a graph illustrating an example of temperature characteristics of an MR read head element when temperature increase due to frequency change under off-disk state of the magnetic head is considered.

FIG. 10 illustrates an example of temperature characteristics of the MR read head element when temperature increase due to frequency change under off-disk state of the magnetic head is considered. In the figure, the lateral axis indicates a write current value (mA), and the longitudinal axis indicates a temperature increase of the read head element (° C.).

As will be understood from the figure, in order to control the temperature increase of the read head element in a range equal to or higher than 25° C. but lower than 60° C., it is necessary to keep the write current under the off-disk state or the dummy current at the write current frequency of 300 MHz equal to or higher than 10 mA but lower than 40 mA, that is equal to or higher than 25% of the normal write current but lower than 100% of the normal write current. At the dummy write current frequency of 400 MHz, it is necessary to keep the dummy current equal to or higher than 10 mA but equal to or lower than 25 mA, that is equal to or higher than 25% of the normal write current but equal to or lower than 62.5% of the normal write current. At the dummy write current frequency of 500 MHz, the temperature increase will exceed 60° C. at the write current of 10 mA. However, in order to control the temperature increase of the read head element lower than 70° C., it is necessary to keep the dummy current equal to or higher than 10 mA but lower than 15 mA, that is equal to or higher than 25% of the normal write current but lower than 37.5% of the normal write current.

It is also noted from the figure that the write characteristics can be certainly recovered without giving any damage to the read head element by selecting the frequency and current conditions so as to keep the frequency of the dummy write current equal to or higher than 300 MHz and the temperature increase of the read head element lower than 60° C.

After performing the dummy write at Step S4 of FIG. 5, when the spindle rotational speed or the rotational speed of the magnetic disk reaches the normal rotational speed (Step S5), an instruction is output from the HDC 25 to the VCM driver 22 to drive the VCM 23, so that the magnetic head 14 is moved onto the data region of the magnetic disk 11, namely to the load position (Step S6).

Thereafter, normal write and read operations such as reading of servo information on the magnetic disk 11 and writing of data to the magnetic disk 11 are performed (Step S7).

The aforementioned dummy write is performed every startup and restartup of the magnetic disk, and thus it is possible to certainly recover the write characteristics of the magnetic head.

Figure 11A:
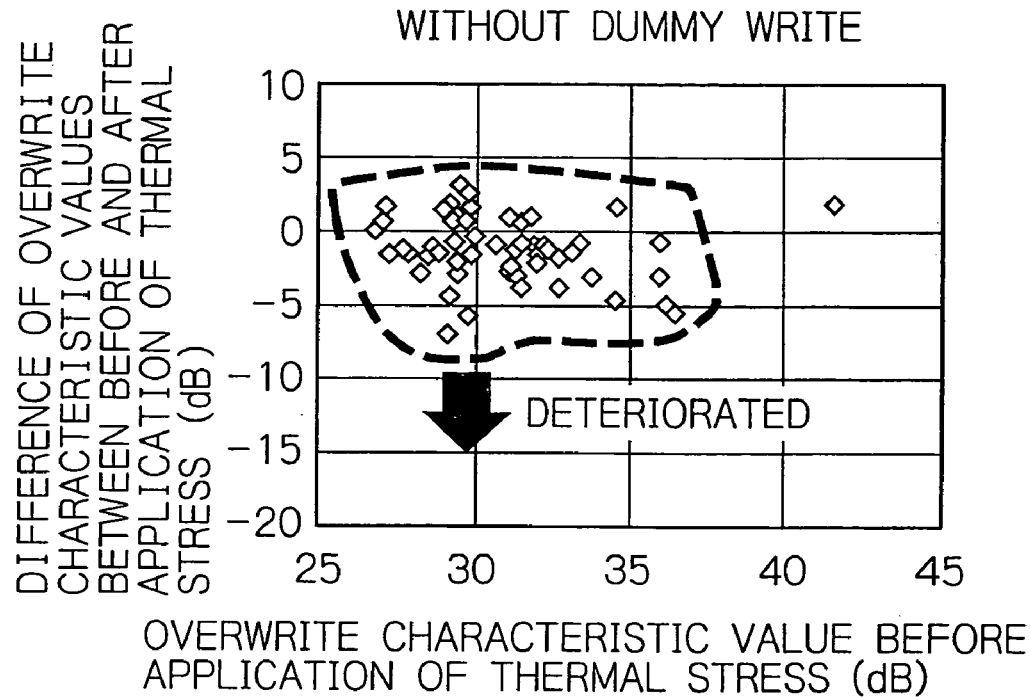
FIGS. 11a and 11b are graphs illustrating differences of overwrite characteristic values of the magnetic head between before and after application of thermal stress.
Figure 11B:
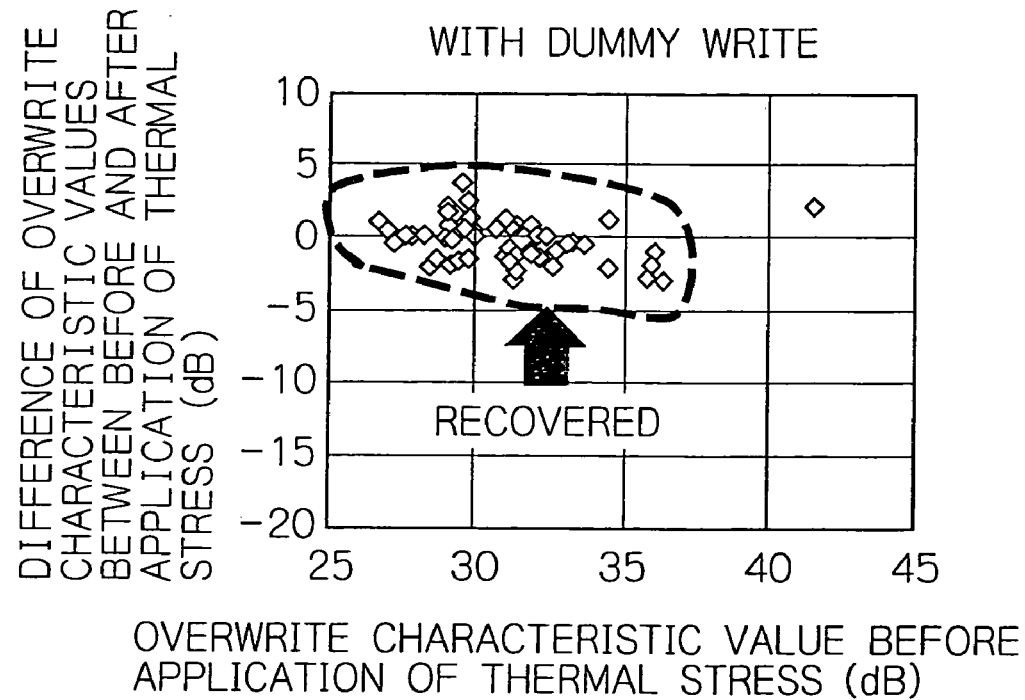

FIGS. 11a and 11b illustrate differences of overwrite characteristic values of the magnetic head between before and after application of thermal stress. In each figure, the lateral axis indicates overwrite characteristic value of the magnetic head before thermal stress is applied (dB), and the longitudinal axis indicates difference of overwrite characteristic values of the magnetic head between before and after application of thermal stress (dB). FIG. 11a is the difference of overwrite characteristic values without dummy write, and FIG. 11b is the difference of overwrite characteristic values with dummy write.

The application of thermal stress in this case was performed by repeating a cycle of setting the magnetic head aside under a first environment of −40° C. for 30 minutes and then under a second environment of +125° C. for 30 minutes ten times.

The difference of overwrite characteristic values between before and after the application of thermal stress without dummy write, shown in FIG. 11a, vary greatly. Whereas the difference of overwrite characteristic values between before and after the application of thermal stress with dummy write, shown in FIG. 11b, do not so vary and are within narrow range. Thus, it is revealed that the write characteristics of the inductive write head element can be recovered by performing the dummy write.

Figure 12A:
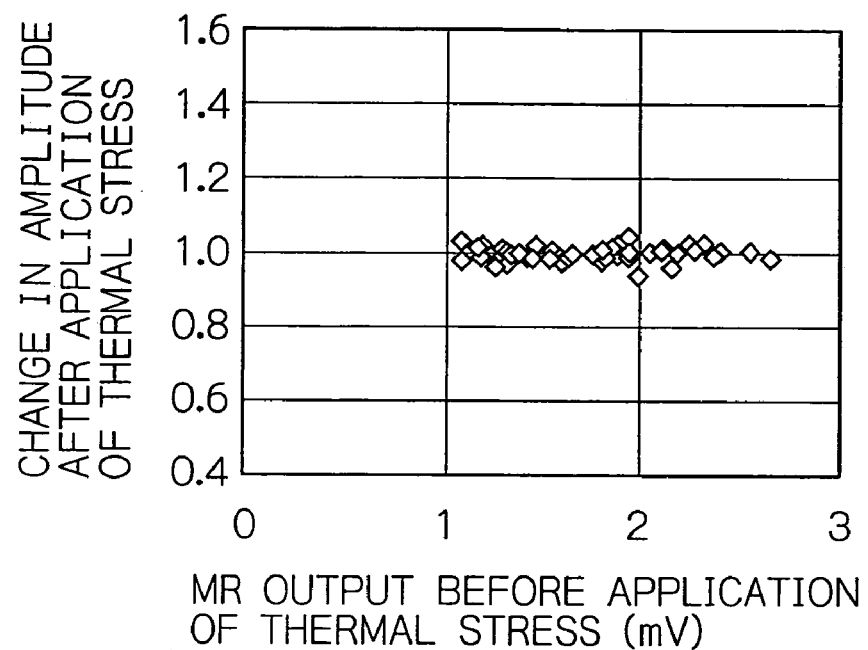
FIGS. 12a and 12b are graphs illustrating change in characteristics of an MR read head element of the magnetic head when thermal stress is applied thereto.
Figure 12B:
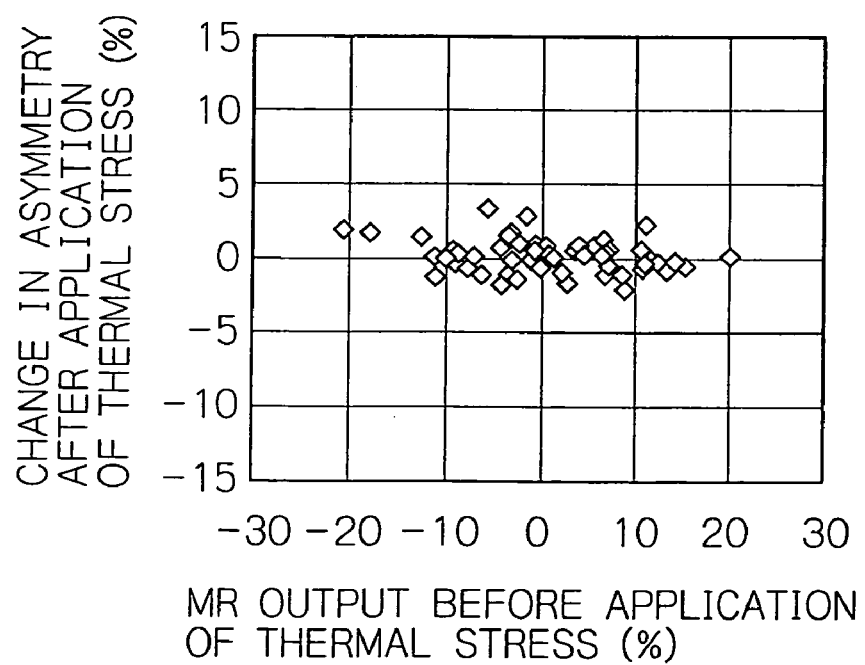

FIGS. 12a and 12b illustrate change in characteristics of an MR read head element of the magnetic head when thermal stress is applied thereto without dummy write. Particularly, FIG. 12a illustrates change in amplitude of the MR read head element. In this figure, the lateral axis indicates MR output before thermal stress is applied (mV), and the longitudinal axis indicates change in amplitude after thermal stress is applied. FIG. 12b illustrates change in asymmetry of the MR read head element. In this figure, the lateral axis indicates MR output before thermal stress is applied (%), and the longitudinal axis indicates change in asymmetry after thermal stress is applied (%).

It will be understood from these figures that the MR read head element does not deteriorate by the application of thermal stress as does in the inductive write head element. Thus, no recovering of characteristics by performing dummy write is necessary for the MR read head element.

As aforementioned, according to this embodiment, because dummy write is performed before the rotational speed of the magnetic disk just after startup reaches the normal rotational speed, the startup time period never extends. Also, because the dummy write is performed at the unload position, no adverse effect is applied to the data area of the magnetic disk.

Further, since the dummy write current is less than 100% of the normal write current value, even if the magnetic head stays at the unload position and therefore no air-cooling effect due to the rotation of the magnetic disk can be expected, the magnetic head is never excessively heated. Thus, the write characteristics of the write head element can be certainly recovered by the dummy write operations without damaging the read head element. Also, the power consumption can be correspondingly reduced.

Figure 13:
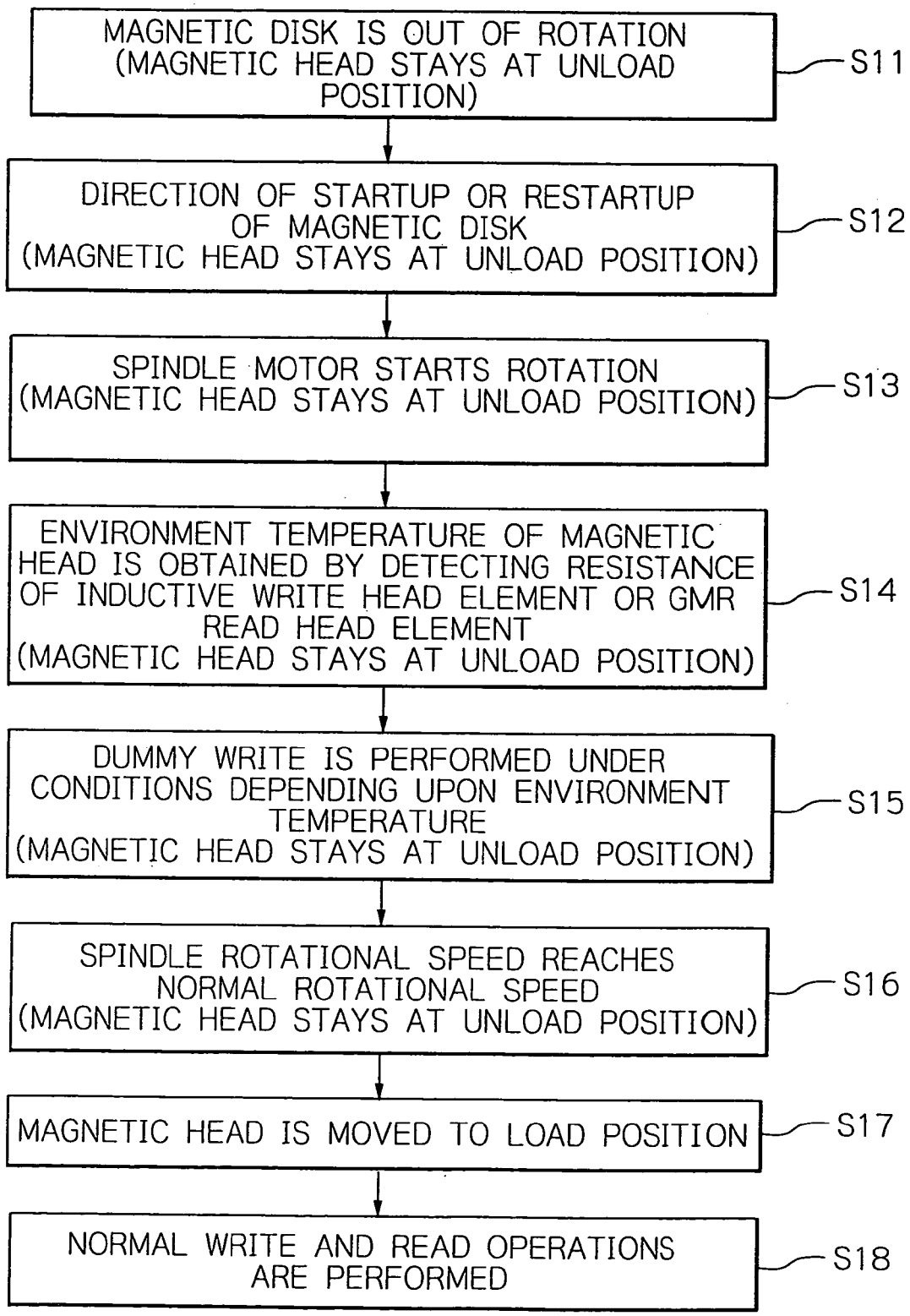
FIG. 13 is a flow chart illustrating a sequence at a startup of a magnetic disk of an HDD apparatus of another embodiment according to the present invention.

FIG. 13 illustrates a sequence at a startup of a magnetic disk of an HDD apparatus of another embodiment according to the present invention.

In this embodiment, dummy write conditions are controlled depending upon an environment temperature of the magnetic head. Mechanical and electrical configurations of the HDD apparatus and sequence of the HDD apparatus at startup of the magnetic disk in this embodiment are substantially the same as those of the embodiment shown in FIG. 1 except for a configuration for detecting environment temperature and a configuration for controlling dummy write conditions depending upon the detected environment temperature. Therefore, the similar components of this embodiment as those of the embodiment of FIG. 1 use the same reference numerals.

The HDD apparatus of this embodiment can be adopted to various systems of the mobile phone and the vehicle-mounted system such as a car navigation system shown in FIGS. 3 and 4. Also, the HDD apparatus may be assembled in mobile equipment such as a walkabout personal computer, a digital audio player or other mobile gear, or the HDD apparatus may be used itself as a mobile storage or a removable HDD.

Hereinafter, operations of the HDD apparatus of this embodiment will be described using FIG. 13.

During out of rotation of the magnetic disk 11, the magnetic head 14 stays at the unload position (Step S11).

When a direction of startup or restartup is given (Step S12), the HDC 25 instructs the motor driver 21 to start the spindle rotation, so as to start a rotation of the spindle motor 21 (Step S13). At this stage, because no drive instruction is output to the VCM driver 22 from the HDC 25, the magnetic head 14 keeps to stay at the unload position.

Under this state, in this embodiment, an environment temperature of the magnetic head 14 is obtained by detecting a resistance of the inductive write head element or the GMR read head element (Step S14). At this stage, the magnetic head 14 keeps to stay at the unload position.

Figure 14:
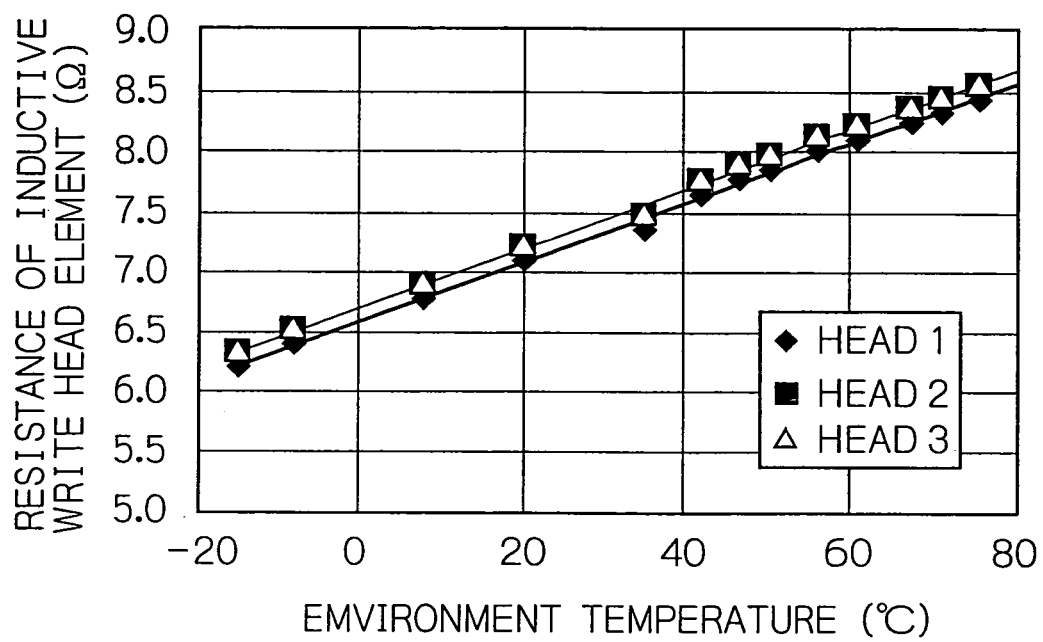
FIG. 14 is a graph illustrating an example of a relationship between a resistance of an inductive write head element and an environment temperature.

The resistance of the inductive write head element can be easily detected by providing a constant current for measurement from the head amplifier to the inductive write head element, and by measuring a voltage across the terminals of the inductive write head element. There is a correlation as shown in FIG. 14 between the resistance of the inductive write head element and its environment temperature. The computer 26 preliminarily stores a table representing this relationship, and therefore the environment temperature of the magnetic head can easily calculate from the measure resistance by using this table.

Figure 15:
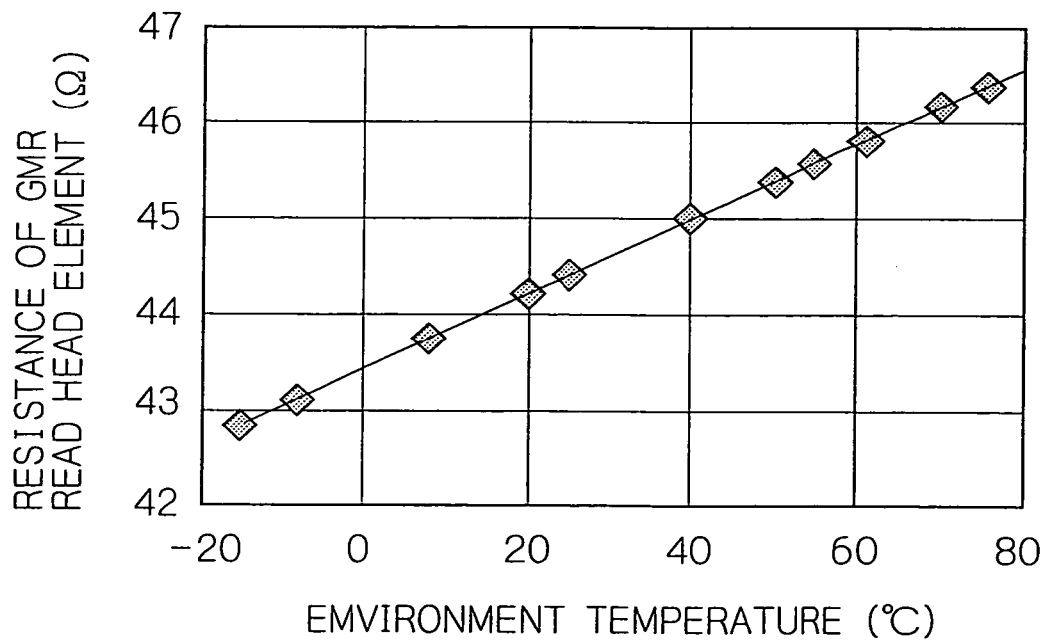
FIG. 15 is a graph illustrating an example of a relationship between a resistance of a giant magnetoresistive effect (GMR) read head element and an environment temperature.

The resistance of the GMR read head element can be easily detected by passing a constant current for measurement from the head amplifier through the GMR read head element, and by measuring a voltage across the terminals of the GMR read head element. There is a correlation as shown in FIG. 15 between the resistance of the GMR read head element and its environment temperature. The computer 26 preliminarily stores a table representing this relationship, and therefore the environment temperature of the magnetic head can easily calculate from the measure resistance by using this table. In case that a TMR read head element is used as the read head element, because a temperature coefficient with respect to its resistance is small, it is difficult to obtain the environment temperature of the magnetic head from the resistance of the TMR read head element.

Then, dummy write conditions such as a dummy write current value, a frequency of the dummy write current and/or an application time of the dummy write current are determined depending upon the obtained environment temperature, and then a signal in accordance with the determined conditions is applied to the head amplifier 24 from the HDC 25 via the read write channel 27 to provide a dummy write current to the inductive write head element. Thus, dummy write is performed (Step S15).

An example of the dummy write conditions depending upon the environment temperature is shown in Table 1. The computer 26 preliminarily equips with a table or an operation routine for determining such conditions in response to the environment temperature. The dummy write conditions are determined to provide a dummy write current depending upon the environment temperature so as to control the temperature of the magnetic head to a predetermined value. Namely, when the environment temperature is low, dummy write current with a larger current value than that when the environment temperature is high is provided. Also, when the environment temperature is low, dummy write current with a higher frequency than that when the environment temperature is high is provided. Further, when the environment temperature is low, because a longer period of time is required for increasing the temperature than that when the environment temperature is high, an application period of dummy write current is determined longer.

More concretely, when a detected environment temperature is equal to or higher than 5° C. but lower than 15° C., because the aimed temperature of the magnetic head is 85° C., it is necessary to increase the temperature of the magnetic head by 80° C. at maximum (when the environment temperature is 5° C.). Thus, it is controlled to provide a dummy write current with a current value of 35 mA that is 0.7 times of the normal write current value of 50 mA and with a frequency value of 280 MHz. As a result, a temperature increase due to the current value becomes 65° C. and a temperature increase due to the frequency value becomes 120%, and then the total temperature increase becomes 65° C.×1.2=78.0° C. that is near the necessary temperature increase of 80° C.

Figure 16A:
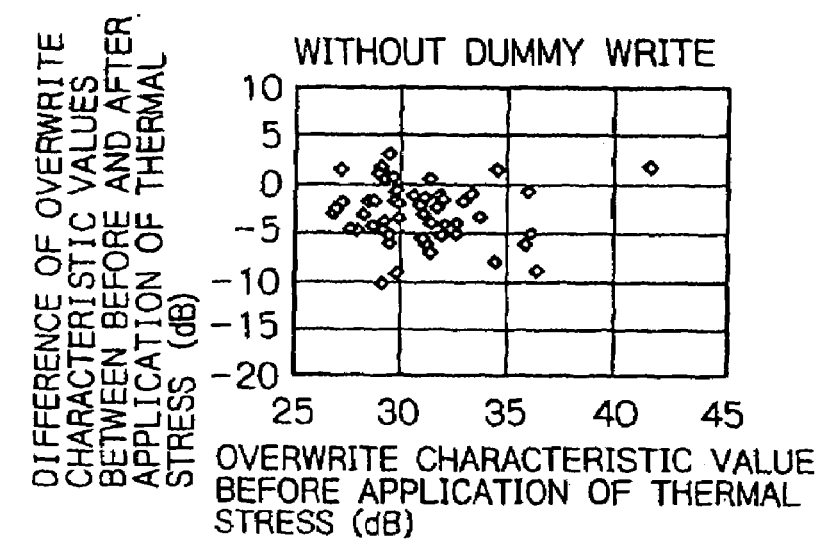
FIGS. 16a to 16c are graphs illustrating change in overwrite characteristics of a magnetic head under an environment temperature of −25° C. between before and after application of thermal stress.
Figure 16B:
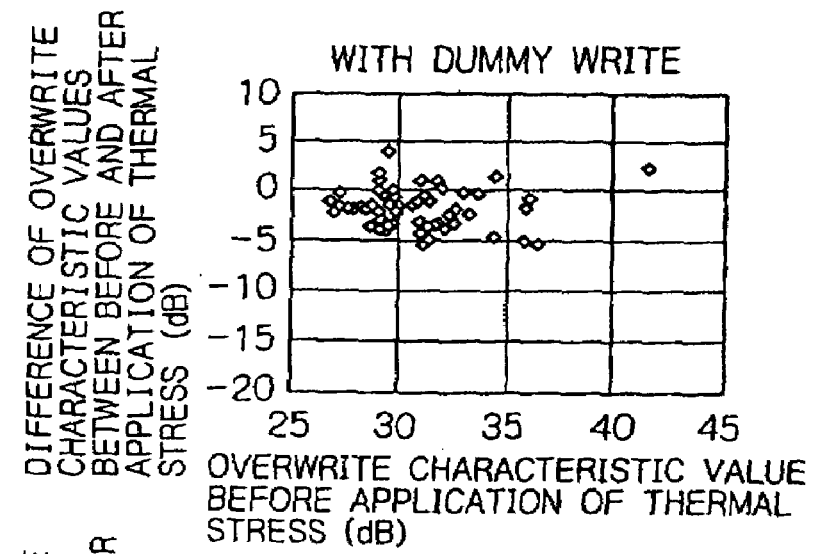
Figure 16C:
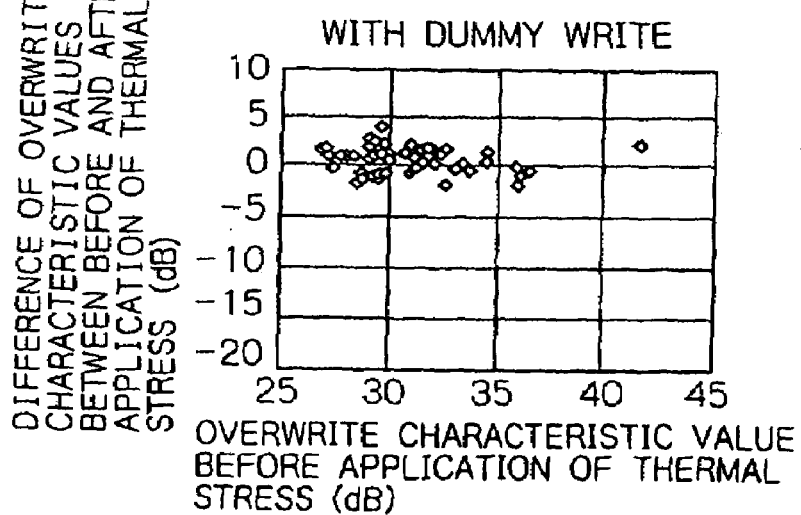

In the example shown in Table 1, the dummy write is controlled in the similar manner when the environment temperature is in other range except that when the environment temperature is equal to or higher than 35° C. and when the environment temperature is lower than 5° C. When the environment temperature is equal to or higher than 35° C., no dummy current is provided. When the environment temperature is lower than 5° C., the application time of the dummy write current is controlled to increase. For example, when a detected environment temperature is equal to or higher than −15° C. but lower than −5° C., because the aimed temperature of the magnetic head is 85° C., it is necessary to increase the temperature of the magnetic head by 100° C. at maximum (when the environment temperature is −15° C.). Thus, it is controlled to provide a dummy write current with a current value of 40 mA that is 0.8 times of the normal write current value of 50 mA and with a frequency value of 300 MHz. As a result, a temperature increase due to the current value becomes 72° C. and a temperature increase due to the frequency value becomes 140%, and then the total temperature increase becomes 72° C.×1.4=100.8° C. that is near the necessary temperature increase of 100° C. In addition, in this case, the application period of time is controlled to increase by 120%.

values between before and after the application of thermal stress with dummy write under the conditions of 40 mA and 375 MHz, shown in FIG. 16c, do not so vary and are within sufficiently narrow range. Thus, it is revealed that the write characteristics of the inductive write head element can be recovered by performing the dummy write under this dummy write conditions.

TABLE 1

| Range of Environment Temperature $T_E$ | Temperature due to Dummy Write | | Dummy Write Current | | | Dummy Write Frequency | | | |
|---|---|---|---|---|---|---|---|---|---|
| | Aimed Temperature (° C.) | Necessary Increase in Temperature (Maximum) (° C.) | Current Value (mA) | Ratio against Normal Current | Temperature Increase due to Current Increase (° C.) | Frequency Value (MHz) | Temperature Increase due to Frequency Increase (%) | Total Temperature Increase (° C.) | Duration of Dummy Write Current Application (%) |
| $T_E \leq 35°$ C. | | | | No Dummy Write | | | | | |
| 25° C. $\leq T_E <$ 35° C. | 85 | 60 | 30 | 0.60 | 55 | 232 | 107 | 58.9 | 100 |
| 15° C. $\leq T_E <$ 25° C. | 85 | 70 | 33 | 0.66 | 60 | 280 | 120 | 72.0 | 100 |
| 5° C. $\leq T_E <$ 15° C. | 85 | 80 | 35 | 0.70 | 65 | 280 | 120 | 78.0 | 100 |
| −5° C. $\leq T_E <$ 5° C. | 85 | 90 | 35 | 0.70 | 65 | 300 | 140 | 91.0 | 120 |
| −15° C. $\leq T_E <$ −5° C. | 85 | 100 | 40 | 0.80 | 72 | 300 | 140 | 100.8 | 120 |
| −25° C. $\leq T_E <$ −15° C. | 85 | 110 | 40 | 0.80 | 72 | 375 | 153 | 110.2 | 120 |
| −35° C. $\leq T_E <$ −25° C. | 85 | 120 | 45 | 0.90 | 78 | 375 | 153 | 119.3 | 150 |
| −45° C. $\leq T_E <$ −35° C. | 85 | 130 | 45 | 0.90 | 78 | 425 | 167 | 130.3 | 150 |

FIGS. 16a to 16c illustrate change in overwrite characteristics of a magnetic head under an environment temperature of −25° C. between before and after application of thermal stress. In each figure, the lateral axis indicates overwrite characteristic value of the magnetic head under the room temperature before thermal stress is applied (dB), and the longitudinal axis indicates difference of overwrite characteristic values of the magnetic head between before and after application of thermal stress (dB). FIG. 16a is the difference of overwrite characteristic values without dummy write, FIG. 16b is the difference of overwrite characteristic values with dummy write under dummy write conditions of 40 mA and 300 MHz, that is, when the environment temperature is equal to or higher than −15° C. but lower than −5° C., and FIG. 16c is the difference of overwrite characteristic values with dummy write under dummy write conditions of 40 mA and 375 MHz, that is, when the environment temperature is equal to or higher than −25° C. but lower than −15° C.

The application of thermal stress in this case was performed by repeating a cycle of setting the magnetic head aside under a first environment of −40° C. for 30 minutes and then under a second environment of +125° C. for 30 minutes ten times.

The difference of overwrite characteristic values between before and after the application of thermal stress without dummy write, shown in FIG. 16a, vary greatly. The difference of overwrite characteristic values between before and after the application of thermal stress with dummy write under the conditions of 40 mA and 300 MHz, shown in FIG. 16b, are within somewhat narrow but insufficient range. Contrary to this, the difference of overwrite characteristic In the condition table shown in Table 1, all of the dummy write current values, the dummy write current frequency and the application period of time of dummy current are controlled depending upon the environment temperature. However, in modifications, one or two of them may be controlled depending upon the environment temperature.

After performing the dummy write at Step S15 of FIG. 13, when the spindle rotational speed or the rotational speed of the magnetic disk reaches the normal rotational speed (Step S16), an instruction is output from the HDC 25 to the VCM driver 22 to drive the VCM 23, so that the magnetic head 14 is moved onto the data region of the magnetic disk 11, namely to the load position (Step S17).

Thereafter, normal write and read operations such as reading of servo information on the magnetic disk 11 and writing of data to the magnetic disk 11 are performed (Step S18).

The aforementioned dummy write is performed every startup and restartup of the magnetic disk, and thus it is possible to certainly recover the write characteristics of the magnetic head.

As aforementioned, according to this embodiment, since an environment temperature of the magnetic head is obtained by detecting a resistance of the inductive write head element or the GMR read head element and the dummy write conditions are variably controlled depending upon the obtained environment temperature, suitable dummy write depending upon the environment temperature of the magnetic head can be executed. Also, because the environment temperature is obtained from the resistance of the inductive write head element or the GMR read head element, it is not necessary to mount an additional element such as a temperature sensor and thus no change in configuration of the HDD apparatus is needed.

Furthermore, according to this embodiment, because dummy write is performed before the rotational speed of the magnetic disk just after startup reaches the normal rotational speed, the startup time never extends. In addition, because the dummy write is performed at the unload position, no adverse effect is applied to the data area of the magnetic disk.

Still further, since the dummy write current is less than 100% of the normal write current value, even if the magnetic head stays at the unload position and therefore no air-cooling effect due to the rotation of the magnetic disk can be expected, the magnetic head is never excessively heated. Thus, the write characteristics of the write head element can be certainly recovered by the dummy write operations without damaging the read head element. Also, the power consumption can be correspondingly reduced.

Figure 17:
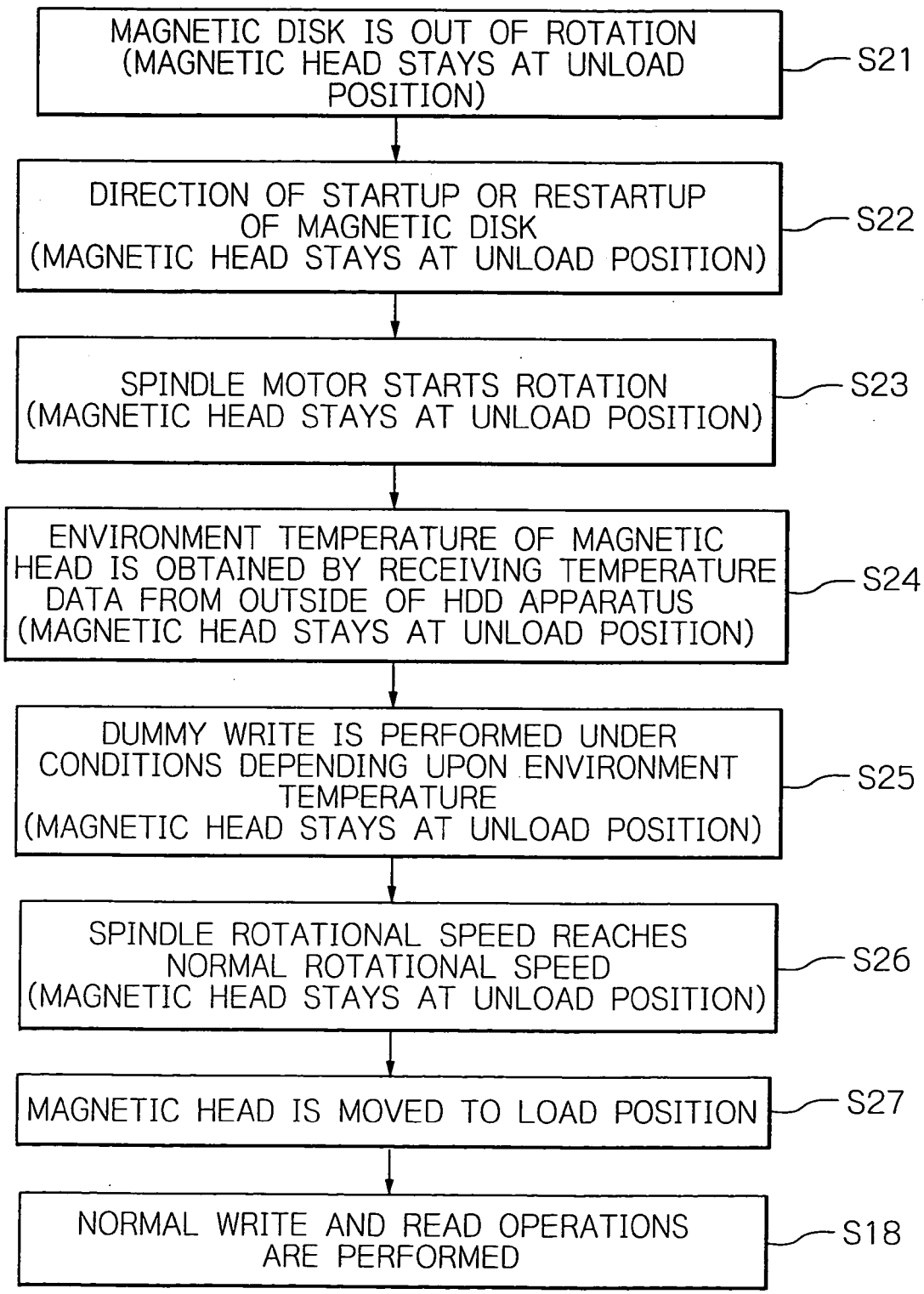
FIG. 17 is a flow chart illustrating a sequence at a startup of a magnetic disk of an HDD apparatus of further embodiment according to the present invention.

FIG. 17 illustrates a sequence at a startup of a magnetic disk of an HDD apparatus of further embodiment according to the present invention.

In this embodiment, dummy write conditions are controlled depending upon an environment temperature of the magnetic head. Mechanical and electrical configurations of the HDD apparatus and sequence of the HDD apparatus at startup of the magnetic disk in this embodiment are substantially the same as those of the embodiment shown in FIG. 1 except for a configuration for detecting environment temperature and a configuration for controlling dummy write conditions depending upon the detected environment temperature. Therefore, the similar components of this embodiment as those of the embodiment of FIG. 1 use the same reference numerals.

The HDD apparatus of this embodiment can be adopted to various systems of the mobile phone and the vehicle-mounted system such as a car navigation system shown in FIGS. 3 and 4. Also, the HDD apparatus may be assembled in mobile equipment such as a walkabout personal computer, a digital audio player or other mobile gear, or the HDD apparatus may be used itself as a mobile storage or a removable HDD.

Hereinafter, operations of the HDD apparatus of this embodiment will be described using FIG. 17.

During out of rotation of the magnetic disk 11, the magnetic head 14 stays at the unload position (Step S21).

When a direction of startup or restartup is given (Step S22), the HDC 25 instructs the motor driver 21 to start the spindle rotation, so as to start a rotation of the spindle motor 21 (Step S23). At this stage, because no drive instruction is output to the VCM driver 22 from the HDC 25, the magnetic head 14 keeps to stay at the unload position.

Under this state, in this embodiment, an environment temperature of the magnetic head 14 is obtained by receiving a temperature data from an external equipment of the HDD apparatus (Step S24). For example, if the HDD apparatus is assemble in a car navigation system, a temperature data measured by the system is acquired. At this stage, the magnetic head 14 keeps to stay at the unload position.

Then, dummy write conditions such as a dummy write current, a frequency of the dummy write current and/or an application time of the dummy write current are determined depending upon the obtained environment temperature, and then a signal depending upon the determined conditions is applied to the head amplifier 24 from the HDC 25 via the read write channel 27 to provide a dummy write current to the inductive write head element. Thus, dummy write is performed (Step S25). The dummy write conditions depending upon the environment temperature are the same as that in the embodiment of FIG. 13.

After performing this dummy write, when the spindle rotational speed or the rotational speed of the magnetic disk reaches the normal rotational speed (Step S26), an instruction is output from the HDC 25 to the VCM driver 22 to drive the VCM 23, so that the magnetic head 14 is moved onto the data region of the magnetic disk 11, namely to the load position (Step S27).

Thereafter, normal write and read operations such as reading of servo information on the magnetic disk 11 and writing of data to the magnetic disk 11 are performed (Step S28).

The aforementioned dummy write is performed every startup and restartup of the magnetic disk, and thus it is possible to certainly recover the write characteristics of the magnetic head.

As aforementioned, according to this embodiment, since an environment temperature of the magnetic head is obtained by receiving a temperature data from outside of the HDD apparatus and the dummy write conditions are variably controlled depending upon the obtained environment temperature, suitable dummy write depending upon the environment temperature of the magnetic head can be executed. Also, because the environment temperature is obtained from outside, it is not necessary to mount an additional element such as a temperature sensor and thus no change in configuration of the HDD apparatus is needed.

Furthermore, according to this embodiment, because dummy write is performed before the rotational speed of the magnetic disk just after startup reaches the normal rotational speed, the startup time never extends. In addition, because the dummy write is performed at the unload position, no adverse effect is applied to the data area of the magnetic disk.

Still further, since the dummy write current is less than 100% of the normal write current value, even if the magnetic head stays at the unload position and therefore no air-cooling effect due to the rotation of the magnetic disk can be expected, the magnetic head is never excessively heated. Thus, the write characteristics of the write head element can be certainly recovered by the dummy write operations without damaging the read head element. Also, the power consumption can be correspondingly reduced.

Figure 18:
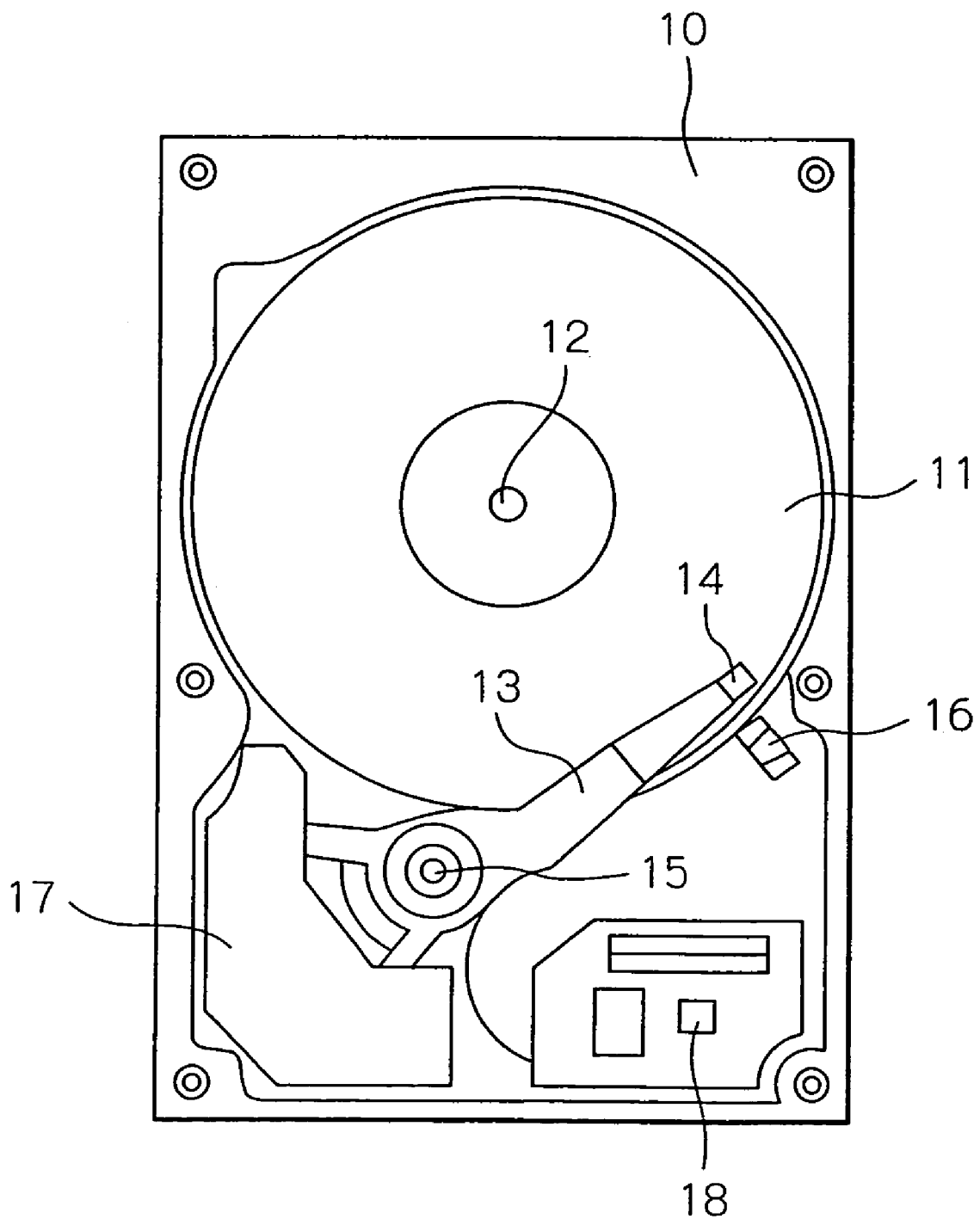
FIG. 18 is a plane view schematically illustrating a whole configuration of a magnetic disk drive apparatus as still further embodiment according to the present invention.

FIG. 18 schematically illustrates a whole configuration of a magnetic disk drive apparatus as still further embodiment according to the present invention. The magnetic disk drive apparatus in this embodiment is a load/unload type HDD apparatus having high impact resistance.

In this embodiment, dummy write conditions are controlled depending upon an environment temperature of the magnetic head. Mechanical and electrical configurations of the HDD apparatus and sequence of the HDD apparatus at startup of the magnetic disk in this embodiment are substantially the same as those of the embodiment shown in FIG. 1 except for a configuration for detecting environment temperature and a configuration for controlling dummy write conditions depending upon the detected environment temperature. Therefore, the similar components of this embodiment as those of the embodiment of FIG. 1 use the same reference numerals.

The HDD apparatus of this embodiment can be adopted to various systems of the mobile phone and the vehicle-mounted system such as a car navigation system shown in FIGS. 3 and 4. Also, the HDD apparatus may be assembled in mobile equipment such as a walkabout personal computer, a digital audio player or other mobile gear, or the HDD apparatus may be used itself as a mobile storage or a removable HDD.

In FIG. 18, reference numeral 10 denotes a housing, 11 denotes a magnetic disk driven by a spindle motor (not shown in this figure) to rotate about an axis 12, 13 denotes an HAA rotationally movable about a horizontal rotation axis 15 in parallel with the surface of the magnetic disk 11, 14 denotes a magnetic head mounted on the top end section of the HAA 13, 16 denotes a ramp located above outside of a data region of the magnetic disk 11 or outside of the magnetic disk 11, 17 denotes a magnet part of a VCM, and 18 denotes a temperature sensor mounted in the HDD apparatus for detecting a temperature of inside of the HDD apparatus, respectively. A coil part of the VCM is mounted on the rear end section of the HAA 13. On an inclined surface of the ramp 16, the top end section of the HAA 13 will be riding during the unload state. The magnetic head 14 in this embodiment is configured by a composite type magnetic head provided with an inductive write head element and a GMR read head element or a TMR read head element.

During out of rotation of the magnetic disk and during low speed rotation of the magnetic disk due to startup or restartup and halting, the top end section of the HAA 13 rides on the ramp 16 to stay the magnetic head 14 at the unload position.

Figure 19:
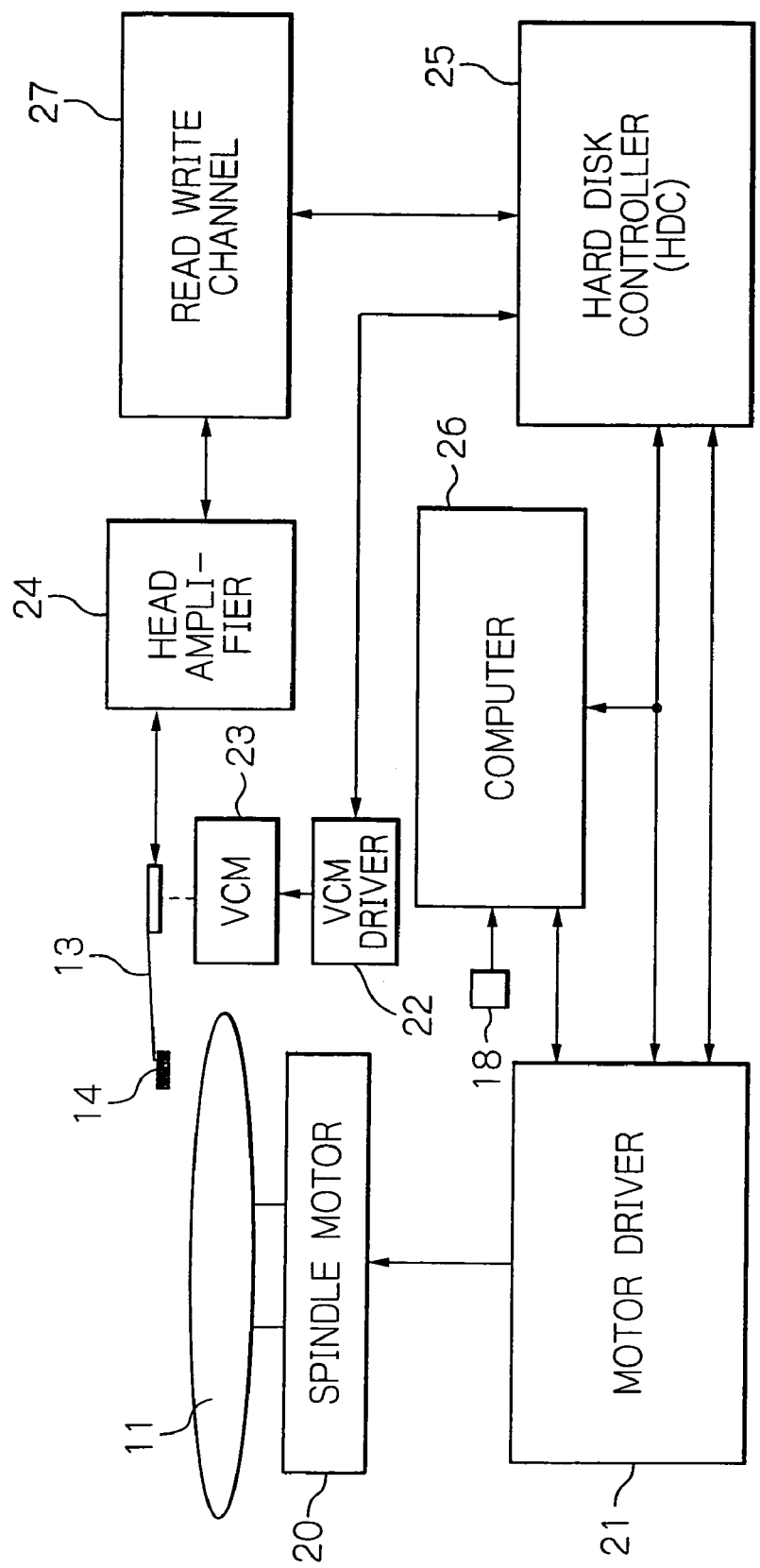
FIG. 19 is a block diagram schematically illustrating an electrical configuration of an HDD apparatus of the embodiment shown in FIG. 18.

FIG. 19 schematically illustrates an electrical configuration of the HDD apparatus of this embodiment.

In the figure, reference numeral 20 denotes the spindle motor for rotating the magnetic disk 11, 21 denotes a motor driver of this spindle motor 20, 22 denotes a VCM driver for the VCM 23, 24 denotes a head amplifier of the magnetic head 14, and 25 denotes an HDC for controlling in accordance with directions from a computer 26 the motor driver 21, the VCM driver 22 and the head amplifier 24 through a read write channel 27, respectively. The temperature sensor 18 is in this embodiment connected with the computer 26.

Figure 20:
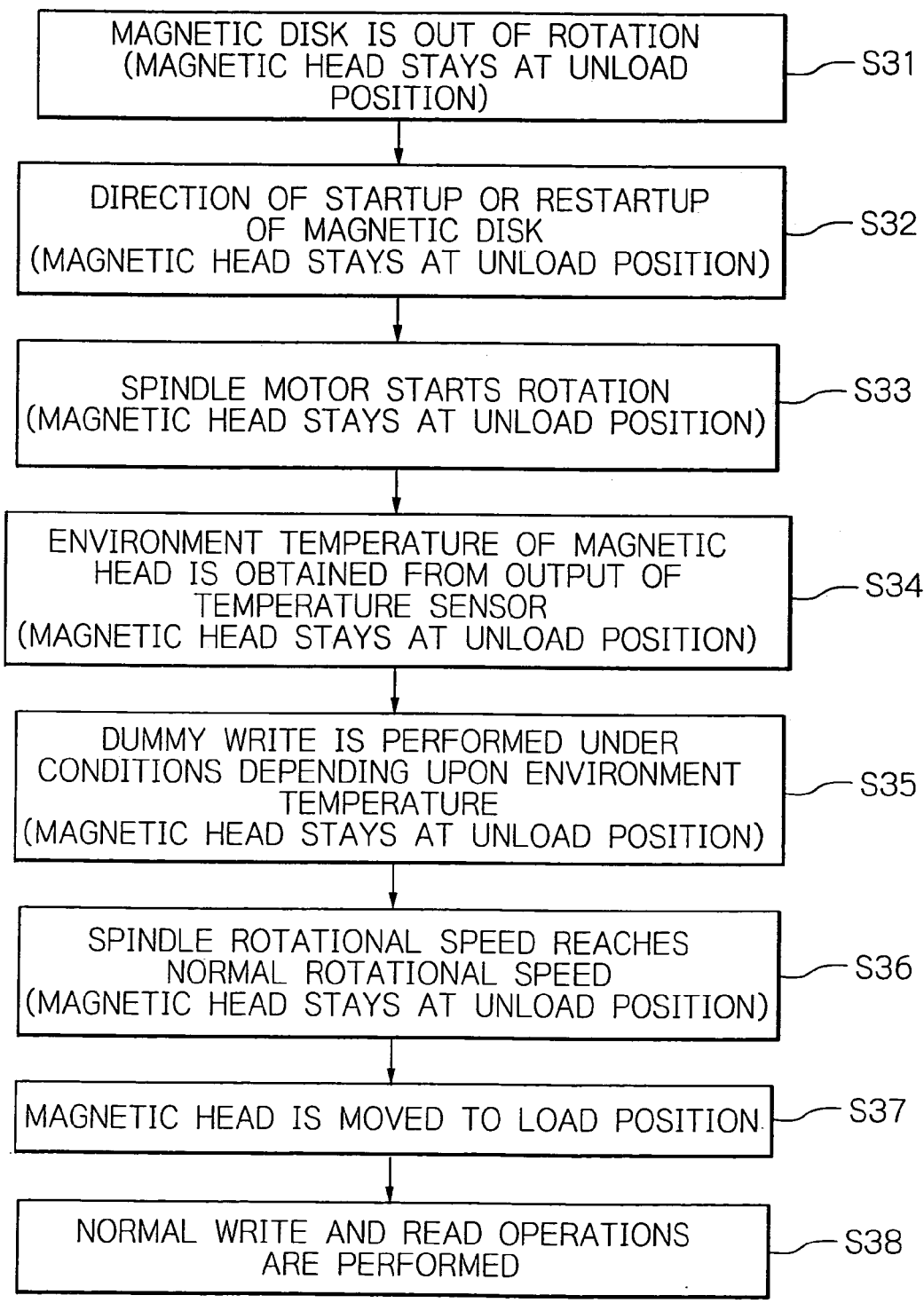
FIG. 20 is a flow chart illustrating a sequence at a startup of a magnetic disk of the HDD apparatus of the embodiment shown in FIG. 18.

FIG. 20 illustrates a sequence at a startup of a magnetic disk of an HDD apparatus of this embodiment.

Hereinafter, operations of the HDD apparatus of this embodiment will be described using FIG. 20.

During out of rotation of the magnetic disk 11, the magnetic head 14 stays at the unload position (Step S31).

When a direction of startup or restartup is given (Step S32), the HDC 25 instructs the motor driver 21 to start the spindle rotation, so as to start a rotation of the spindle motor 21 (Step S33). At this stage, because no drive instruction is output to the VCM driver 22 from the HDC 25, the magnetic head 14 keeps to stay at the unload position.

Under this state, in this embodiment, an environment temperature of the magnetic head 14 is obtained by receiving output of the temperature sensor 18 (Step S34). At this stage, the magnetic head 14 keeps to stay at the unload position.

Then, dummy write conditions such as a dummy write current, a frequency of the dummy write current and/or an application time of the dummy write current are determined depending upon the obtained environment temperature, and then a signal depending upon the determined conditions is applied to the head amplifier 24 from the HDC 25 via the read write channel 27 to provide a dummy write current to the inductive write head element. Thus, dummy write is performed (Step S35). The dummy write conditions depending upon the environment temperature are the same as that in the embodiment of FIG. 13.

After performing this dummy write, when the spindle rotational speed or the rotational speed of the magnetic disk reaches the normal rotational speed (Step S36), an instruction is output from the HDC 25 to the VCM driver 22 to drive the VCM 23, so that the magnetic head 14 is moved onto the data region of the magnetic disk 11, namely to the load position (Step S37).

Thereafter, normal write and read operations such as reading of servo information on the magnetic disk 11 and writing of data to the magnetic disk 11 are performed (Step S38).

The aforementioned dummy write is performed every startup and restartup of the magnetic disk, and thus it is possible to certainly recover the write characteristics of the magnetic head.

As aforementioned, according to this embodiment, since an environment temperature of the magnetic head is obtained by receiving output of the temperature sensor mounted in the HDD apparatus and the dummy write conditions are variably controlled depending upon the obtained environment temperature, suitable dummy write depending upon the environment temperature of the magnetic head can be executed.

Furthermore, according to this embodiment, because dummy write is performed before the rotational speed of the magnetic disk just after startup reaches the normal rotational speed, the startup time never extends. In addition, because the dummy write is performed at the unload position, no adverse effect is applied to the data area of the magnetic disk.

Still further, since the dummy write current is less than 100% of the normal write current value, even if the magnetic head stays at the unload position and therefore no air-cooling effect due to the rotation of the magnetic disk can be expected, the magnetic head is never excessively heated. Thus, the write characteristics of the write head element can be certainly recovered by the dummy write operations without damaging the read head element. Also, the power consumption can be correspondingly reduced.

Figure 21:
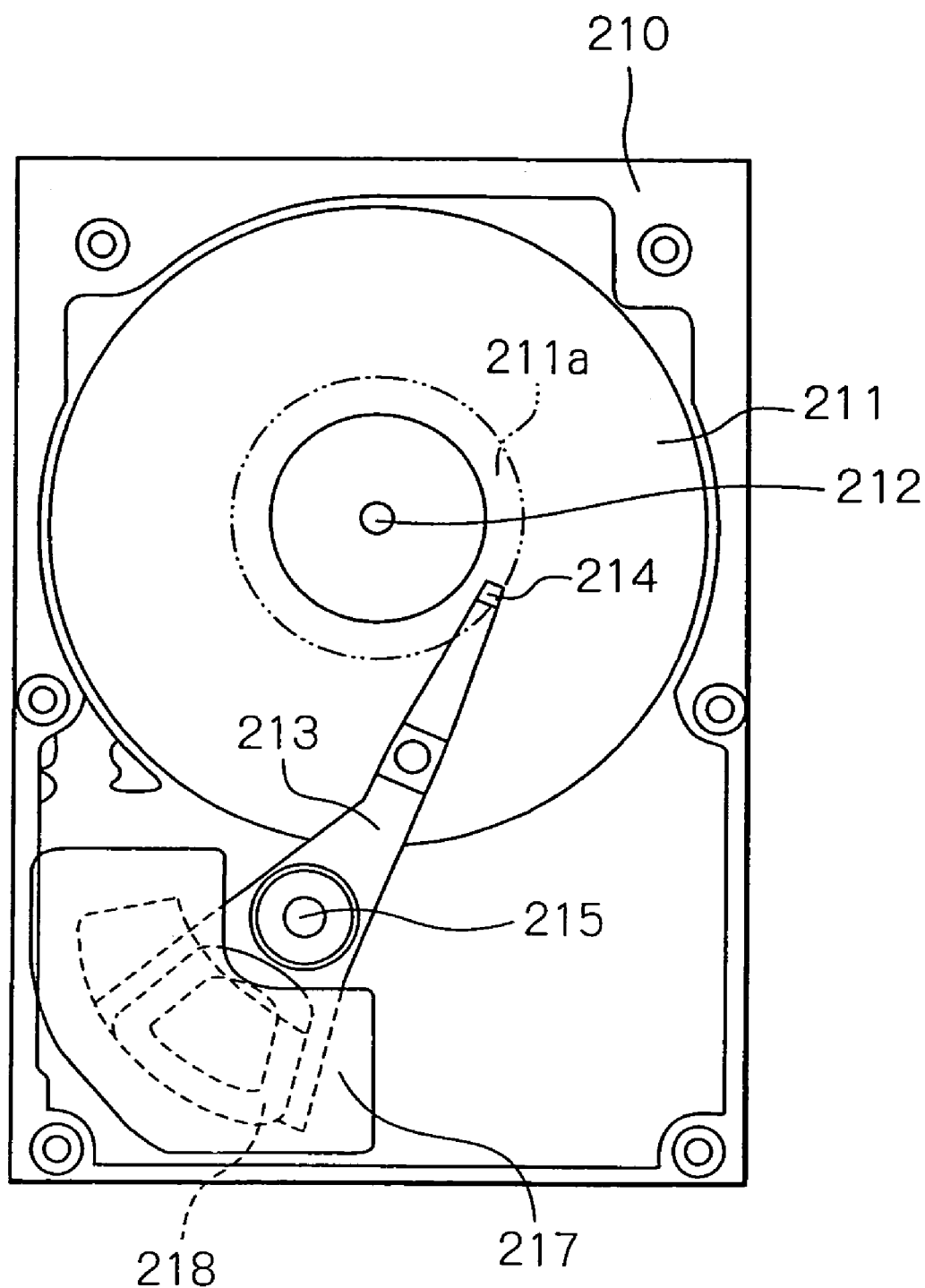
FIG. 21 is a plane view schematically illustrating a whole configuration of a magnetic disk drive apparatus as further embodiment according to the present invention.

FIG. 21 schematically illustrates a whole configuration of a magnetic disk drive apparatus as further embodiment according to the present invention. The magnetic disk drive apparatus in this embodiment is a typical CSS type HDD apparatus.

Mechanical and electrical configurations of the HDD apparatus and sequence of the HDD apparatus at startup of the magnetic disk in this embodiment are substantially the same as those of the aforementioned embodiments except that the this embodiment uses the CSS type HDD apparatus instead of the load/unload type HDD apparatus in the embodiments of FIGS. 1, 13, 17 and 18. Therefore, the similar components of this embodiment as those of the embodiments use the same reference numerals.

The HDD apparatus of this embodiment can be adopted to various systems of the mobile phone and the vehicle-mounted system such as a car navigation system shown in FIGS. 3 and 4. Also, the HDD apparatus may be assembled in mobile equipment such as a walkabout personal computer, a digital audio player or other mobile gear, or the HDD apparatus may be used itself as a mobile storage or a removable HDD.

In FIG. 21, reference numeral 210 denotes a housing, 211 denotes a magnetic disk driven by a spindle motor (not shown in this figure) to rotate about an axis 212, 213 denotes an HAA rotationally movable about a horizontal rotation axis 215 in parallel with the surface of the magnetic disk 211, 214 denotes a magnetic head mounted on the top end section of the HAA 213, 217 denotes a magnet part of a VCM, and 218 denotes a coil part of the VCM, respectively. The magnetic head 214 in this embodiment is configured by a composite type magnetic head provided with an inductive write head element and a GMR read head element or a TMR read head element.

During out of rotation of the magnetic disk and during low speed rotation of the magnetic disk due to startup or restartup and halting, the magnetic head 214 attached to the top end section of the HAA 213 stays within a CSS region 211a located near the center side of the data region of the magnetic disk 211.

Other configurations, operations, functions and advantages in this embodiment are substantially the same as these in the embodiments of FIGS. 1, 13, 17 and 18.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A magnetic disk drive apparatus comprising:
a magnetic disk with a data region;
a magnetic head located in a region of said magnetic disk other than said data region or outside of said magnetic disk before startup of said magnetic disk and loaded on said data region after the startup; and
a current supply means for providing, just after the startup, a dummy write current with a current value lower than a normal write current value to said magnetic head located in the region of said magnetic disk other than said data region or outside of said magnetic disk.

2. The magnetic disk drive apparatus as claimed in claim 1, wherein said current supply means comprises a dummy write condition control means for controlling conditions of the dummy write current in accordance with an environment temperature of said magnetic head.

3. The magnetic disk drive apparatus as claimed in claim 2, wherein said magnetic disk drive apparatus further comprises a temperature detection means for obtaining the environment temperature of said magnetic head, and wherein said dummy write condition control means comprises means for determining conditions of the dummy write current in accordance with the environment temperature obtained by said temperature detection means and means for providing the dummy write current to said magnetic head based upon the determined conditions.

4. The magnetic disk drive apparatus as claimed in claim 3, wherein said magnetic head includes an inductive write head element, and wherein said temperature detection means comprises means for detecting a resistance of said inductive write head element.

5. The magnetic disk drive apparatus as claimed in claim 3, wherein said magnetic head includes an inductive write head element and a magnetoresistive effect read head element, and wherein said temperature detection means comprises means for detecting a resistance of said magnetoresistive effect read head element.

6. The magnetic disk drive apparatus as claimed in claim 2, wherein said dummy write condition control means comprises means for determining conditions of the dummy write current in accordance with temperature data representing the environment temperature of said magnetic head, said temperature data being provided from outside of said magnetic disk drive apparatus, and means for providing the dummy write current to said magnetic head based upon the determined conditions.

7. The magnetic disk drive apparatus as claimed in claim 2, wherein said dummy write condition control means comprises means for determining conditions of the dummy write current in accordance with the environment temperature so that a temperature of said magnetic head becomes a predetermined temperature and means for providing the dummy write current to said magnetic head based upon the determined conditions.

8. The magnetic disk drive apparatus as claimed in claim 7, wherein said dummy write condition control means comprises means for providing the dummy write current with a current value larger when the environment temperature is low than when the environment temperature is high to said magnetic head.

9. The magnetic disk drive apparatus as claimed in claim 7, wherein said dummy write condition control means comprises means for providing the dummy write current with a frequency higher when the environment temperature is low than when the environment temperature is high to said magnetic head.

10. The magnetic disk drive apparatus as claimed in claim 7, wherein said dummy write condition control means comprises means for providing the dummy write current to said magnetic head for a period of time longer when the environment temperature is low than when the environment temperature is high.

11. The magnetic disk drive apparatus as claimed in claim 1, wherein said dummy write condition control means comprises means for providing the dummy write current to said magnetic head after said magnetic disk starts its rotation and until the rotational speed of said magnetic disk reaches a normal constant rotational speed.

12. The magnetic disk drive apparatus as claimed in claim 1, wherein said dummy write condition control means comprises means for providing the dummy write current with a current value equal to or larger than 25% of a normal write current value to said magnetic head.

13. The magnetic disk drive apparatus as claimed in claim 1, wherein said dummy write condition control means comprises means for providing the dummy write current to said magnetic head so that a temperature increase of said magnetic head is kept lower than 60° C.

14. The magnetic disk drive apparatus as claimed in claim 1, wherein said dummy write condition control means comprises means for providing the dummy write current to said magnetic head at every time of startup and restartup of said magnetic disk.

15. A mobile phone having a magnetic disk drive apparatus comprising:
a magnetic disk with a data region;
a magnetic head located in a region of said magnetic disk other than said data region or outside of said magnetic disk before startup of said magnetic disk and loaded on said data region after the startup; and
a current supply means for providing, just after the startup, a dummy write current with a current value lower than a normal write current value to said magnetic head located in the region of said magnetic disk other than said data region or outside of said magnetic disk.

16. A vehicle-mounted system having a magnetic disk drive apparatus comprising:
a magnetic disk with a data region;

a magnetic head located in a region of said magnetic disk other than said data region or outside of said magnetic disk before startup of said magnetic disk and loaded on said data region after the startup; and a current supply means for providing, just after the startup, a dummy write current with a current value lower than a normal write current value to said magnetic head located in the region of said magnetic disk other than said data region or outside of said magnetic disk.

17. A method for compensating characteristics of a magnetic disk drive apparatus having a magnetic disk with a data region and a magnetic head, said method comprising a step of providing, just after a startup of said magnetic disk, a dummy write current with a current value lower than a normal write current value to said magnetic head located in a region of said magnetic disk other than said data region or outside of said magnetic disk.

18. The method as claimed in claim 17, wherein said step comprises a dummy write condition control step of controlling conditions of the dummy write current in accordance with an environment temperature of said magnetic head.

19. The method as claimed in claim 18, wherein said method further comprises a step of obtaining the environment temperature of said magnetic head, and wherein said dummy write condition control step comprises a step of determining conditions of the dummy write current in accordance with the environment temperature obtained and a step of providing the dummy write current to said magnetic head based upon the determined conditions.

20. The method as claimed in claim 19, wherein said magnetic head includes an inductive write head element, and wherein said step of obtaining the environment temperature comprises a step of detecting a resistance of said inductive write head element.

21. The method as claimed in claim 19, wherein said magnetic head includes an inductive write head element and a magnetoresistive effect read head element, and wherein said step of obtaining the environment temperature comprises a step of detecting a resistance of said magnetoresistive effect read head element.

22. The method as claimed in claim 18, wherein said dummy write condition control step comprises a step of determining conditions of the dummy write current in accordance with temperature data representing the environment temperature of said magnetic head, said temperature data being provided from outside of said magnetic disk drive apparatus, and a step of providing the dummy write current to said magnetic head based upon the determined conditions.

23. The method as claimed in claim 18, wherein said dummy write condition control step comprises a step of determining conditions of the dummy write current in accordance with the environment temperature so that a temperature of said magnetic head becomes a predetermined temperature and a step of providing the dummy write current to said magnetic head based upon the determined conditions.

24. The method as claimed in claim 23, wherein said dummy write condition control step comprises a step of providing the dummy write current with a current value larger when the environment temperature is low than when the environment temperature is high to said magnetic head.

25. The method as claimed in claim 23, wherein said dummy write condition control step comprises a step of providing the dummy write current with a frequency higher when the environment temperature is low than when the environment temperature is high to said magnetic head.

26. The method as claimed in claim 23, wherein said dummy write condition control step comprises a step of providing the dummy write current to said magnetic head for a period of time longer when the environment temperature is low than when the environment temperature is high.

27. The method as claimed in claim 17, wherein said dummy write condition control step comprises a step of providing the dummy write current to said magnetic head after said magnetic disk starts its rotation and until the rotational speed of said magnetic disk reaches a normal constant rotational speed.

28. The method as claimed in claim 17, wherein said dummy write condition control step comprises a step of providing the dummy write current with a current value equal to or larger than 25% of a normal write current value to said magnetic head.

29. The method as claimed in claim 17, wherein said dummy write condition control step comprises a step of providing the dummy write current to said magnetic head so that a temperature increase of said magnetic head is kept lower than 60° C.

30. The method as claimed in claim 17, wherein said dummy write condition control step comprises a step of providing the dummy write current to said magnetic head at every time of startup and restartup of said magnetic disk.

* * * * *